United States Patent
Broom et al.

(10) Patent No.: US 10,246,114 B2
(45) Date of Patent: *Apr. 2, 2019

(54) ITEM DISPENSING APPARATUS

(71) Applicant: Innovative Product Achievements, LLC, Duluth, GA (US)

(72) Inventors: Ward Broom, Atlanta, GA (US); Kyle Joiner, Roswell, GA (US); Bob Stonikas, Suwanee, GA (US); Dan Weyen, Suwanee, GA (US); James Findley, Grantville, GA (US)

(73) Assignee: Innovative Product Achievements, LLC, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,743

(22) Filed: Nov. 6, 2017

(65) Prior Publication Data

US 2018/0065652 A1 Mar. 8, 2018

Related U.S. Application Data

(63) Continuation of application No. 15/013,779, filed on Feb. 2, 2016, now Pat. No. 9,809,240.

(Continued)

(51) Int. Cl.
*B62B 3/00* (2006.01)
*B62B 3/02* (2006.01)
(Continued)

(52) U.S. Cl.
CPC ............ *B62B 3/005* (2013.01); *A61G 12/001* (2013.01); *B62B 3/004* (2013.01); *B62B 3/02* (2013.01);
(Continued)

(58) Field of Classification Search
CPC ............ B62B 3/00; B62B 3/002; B62B 3/004; B62B 3/005; B62B 3/02; B62B 2301/08; A61G 12/001
See application file for complete search history.

(56) References Cited

U.S. PATENT DOCUMENTS

| 328,224 A | 10/1885 | Jacobson |
|---|---|---|
| 2,202,358 A | 5/1940 | Stone |

(Continued)

FOREIGN PATENT DOCUMENTS

| CN | 201236594 Y | 5/2009 |
|---|---|---|
| CN | 201909966 U | 7/2011 |

(Continued)

OTHER PUBLICATIONS

International Preliminary Examining Authority, International Report on Patentability (Chapter II) for International Application No. PCT/US2016/016198, dated Apr. 26, 2017, 8 pages, European Patent Office, Netherlands.

(Continued)

*Primary Examiner* — Brian L Swenson
(74) *Attorney, Agent, or Firm* — Alston & Bird LLP

(57) ABSTRACT

Various embodiments of the present invention are directed to a dispenser configured for securely storing a plurality of items within a cart and providing access to a subset of the plurality of items to authorized users. According to various embodiments, the dispenser generally includes a housing defining an interior portion dimensioned to receive a storage cart having an array of receptacles each configured to hold one or more items, a laterally sliding access door configured to provide restricted access to the cart stored within the dispenser, and an item access mechanism configured to provide selective access to a subset of the plurality of items stored within the cart. The dispenser additionally comprises a cart guide mechanism and a cart locking mechanism (Continued)

configured to guide the cart into the housing and to secure the cart in an appropriate location within the housing for use with the item access mechanism.

15 Claims, 36 Drawing Sheets

Related U.S. Application Data

(60) Provisional application No. 62/148,120, filed on Apr. 15, 2015, provisional application No. 62/110,972, filed on Feb. 2, 2015.

(51) Int. Cl.
*A61G 12/00* (2006.01)
*G07F 11/62* (2006.01)
*G07F 17/00* (2006.01)
*A47F 3/06* (2006.01)

(52) U.S. Cl.
CPC .......... *G07F 11/62* (2013.01); *G07F 17/0092* (2013.01); *A47F 2003/066* (2013.01)

(56) References Cited

U.S. PATENT DOCUMENTS

| | | | |
|---|---|---|---|
| 3,055,419 A | 9/1962 | Rubin et al. |
| 3,058,320 A | 10/1962 | Foster et al. |
| 3,116,097 A | 12/1963 | Novales |
| 3,249,294 A | 5/1966 | Hughes et al. |
| 3,282,382 A | 11/1966 | Thompson |
| 3,392,543 A | 7/1968 | Miller |
| 3,439,725 A | 4/1969 | Haimovitz |
| 3,455,621 A | 7/1969 | Kingsley |
| 3,464,509 A | 9/1969 | Gray |
| 3,639,919 A | 2/1972 | White |
| 3,687,546 A | 8/1972 | Endebrock et al. |
| 3,690,118 A | 9/1972 | Rainwater |
| 3,712,363 A | 1/1973 | Thomassen |
| 3,719,408 A | 3/1973 | Fullington |
| 3,752,550 A | 8/1973 | Niemeyer |
| 3,785,669 A | 1/1974 | Doheny |
| 3,807,480 A | 4/1974 | Smart |
| 3,834,865 A | 9/1974 | Lee |
| 3,861,768 A | 1/1975 | Wilson |
| 3,961,675 A | 6/1976 | Siegel |
| 4,034,572 A | 7/1977 | Morris et al. |
| 4,037,526 A | 7/1977 | Jaekle |
| 4,073,369 A | 2/1978 | Nordskog |
| 4,077,228 A | 3/1978 | Schumacher et al. |
| 4,108,363 A | 8/1978 | Susumu |
| 4,192,436 A | 3/1980 | Schuller et al. |
| 4,281,730 A | 8/1981 | Swersey et al. |
| 4,365,854 A | 12/1982 | Waller |
| 4,401,216 A | 8/1983 | Koch |
| 4,491,375 A | 1/1985 | Ugalde |
| 4,509,577 A | 4/1985 | Priefert |
| 4,891,755 A | 1/1990 | Asher |
| 4,974,658 A | 12/1990 | Komatsu et al. |
| 4,976,301 A | 12/1990 | Easley et al. |
| 5,067,630 A | 11/1991 | Nesser et al. |
| 5,085,261 A | 2/1992 | Bortoluzzi |
| 5,163,495 A | 11/1992 | Lichy |
| 5,370,722 A | 12/1994 | Simmons |
| 5,379,823 A | 1/1995 | Kraeutler |
| 5,385,265 A | 1/1995 | Schlamp |
| 5,657,805 A | 8/1997 | Magro |
| 5,683,221 A | 11/1997 | Ablabutyan |
| 5,724,764 A | 3/1998 | Alsup |
| 5,875,597 A | 3/1999 | Gingrich et al. |
| 5,964,270 A | 10/1999 | Kirkey et al. |
| 5,971,512 A * | 10/1999 | Swan .............. B25H 1/10 211/131.1 |
| 6,024,153 A | 2/2000 | Goldman |
| 6,282,914 B1 | 9/2001 | Steinhoff et al. |
| 6,385,505 B1 | 5/2002 | Lipps |
| 6,394,738 B1 * | 5/2002 | Springer ............. B62D 49/08 187/232 |
| 6,397,916 B1 | 6/2002 | Bengtsson et al. |
| 6,409,187 B1 | 6/2002 | Crow, Jr. |
| 6,409,589 B1 | 6/2002 | Laconico, Jr. et al. |
| 6,450,598 B1 | 9/2002 | Hänel |
| 6,502,718 B2 | 1/2003 | Fitzgerald et al. |
| 6,510,566 B2 | 1/2003 | Bryce |
| 6,595,606 B1 | 7/2003 | Gunst |
| 6,615,894 B1 | 9/2003 | McKeon |
| 6,626,508 B1 | 9/2003 | Hase et al. |
| 6,848,491 B2 | 2/2005 | Gambarelli et al. |
| 6,910,302 B2 | 6/2005 | Crawford |
| 6,994,409 B2 | 2/2006 | Godlewski |
| 7,134,242 B2 | 11/2006 | Fitzgerald |
| 7,282,652 B1 | 10/2007 | Johnson et al. |
| 7,353,658 B2 | 4/2008 | Voute et al. |
| 7,407,238 B2 | 8/2008 | Fitzgerald |
| 7,428,447 B2 | 9/2008 | Stonikas et al. |
| 7,628,410 B2 | 12/2009 | Fitzgerald et al. |
| 7,874,562 B2 | 1/2011 | Fitzgerald et al. |
| 8,229,802 B2 | 7/2012 | Henry |
| 8,744,621 B2 | 6/2014 | Michael |
| 8,763,672 B2 | 7/2014 | Smart et al. |
| 9,208,635 B2 | 12/2015 | Fitzgerald et al. |
| 9,245,406 B2 | 1/2016 | Fitzgerald et al. |
| 9,478,093 B2 | 10/2016 | Broom et al. |
| 9,576,418 B2 | 2/2017 | Fitzgerald et al. |
| 2001/0042346 A1 | 11/2001 | Brioschi |
| 2002/0130135 A1 | 9/2002 | Fitzgerald et al. |
| 2003/0025424 A1 | 2/2003 | Graves |
| 2003/0221797 A1 | 12/2003 | Schaller |
| 2004/0004419 A1 | 1/2004 | Godlewski |
| 2004/0031574 A1 | 2/2004 | Gambarelli et al. |
| 2004/0206462 A1 | 10/2004 | Fitzgerald et al. |
| 2004/0245272 A1 | 12/2004 | Fitzgerald et al. |
| 2005/0060938 A1 | 3/2005 | Fitzgerald |
| 2006/0230683 A1 | 10/2006 | Hung |
| 2006/0250056 A1 | 11/2006 | Fitzgerald |
| 2006/0266770 A1 | 11/2006 | Fitzgerald |
| 2007/0073441 A1 | 3/2007 | Stonikas et al. |
| 2007/0080519 A1 | 4/2007 | Murdock |
| 2008/0001031 A1 | 1/2008 | Doebertin et al. |
| 2008/0272137 A1 | 11/2008 | Fitzgerald et al. |
| 2008/0272139 A1 | 11/2008 | Fitzgerald |
| 2008/0272141 A1 | 11/2008 | Fitzgerald et al. |
| 2008/0272564 A1 | 11/2008 | Fitzgerald et al. |
| 2008/0272565 A1 | 11/2008 | Fitzgerald et al. |
| 2013/0123978 A1 | 5/2013 | Stark et al. |
| 2013/0211585 A1 | 8/2013 | Broom et al. |
| 2014/0091684 A1 | 4/2014 | Fitzgerald et al. |
| 2014/0368100 A1 | 12/2014 | Burd |

FOREIGN PATENT DOCUMENTS

| | | |
|---|---|---|
| EP | 0553470 A1 | 8/1993 |
| EP | 1061013 A1 | 12/2000 |
| EP | 1382273 A1 | 1/2004 |
| JP | H06-045082 A | 2/1994 |
| JP | H06-045082 U | 6/1994 |
| JP | 2004035267 A | 2/2004 |
| JP | 2008-036143 A | 2/2008 |
| JP | 2010-077709 A | 4/2010 |

OTHER PUBLICATIONS

International Preliminary Examining Authority, Written Opinion for International Application No. PCT/US2016/016198, dated Jan. 5, 2017, 7 pages, European Patent Office, Netherlands.

International Searching Authority, International Search Report and Written Opinion for International Application No. PCT/US20163/016198, dated Jul. 12, 2016, 18 pages, European Patent Office, Netherlands.

International Searching Authority, Invitation to Pay Additional Fees and, Where Applicable, Protest Fee for International Application

(56) References Cited

OTHER PUBLICATIONS

No. PCT/2016/016198, dated May 3, 2016, 8 pages, European Patent Office, The Netherlands.
LTL Home Products, Inc., "Spectrum Folding Doors," Mar. 30, 2009 to Jul. 12, 2012, Internet Archive <http://web.archive.org/web/20090330195345/http://www.ltlhomeproducts.com/oakmont-folding-doors.php>, 1 page.
Servicor Cleanroom Products, "Sliding Track Curtains," Feb. 25, 2002 to Dec. 31, 2008, Internet Archive <http://web.archive.org/web/20080509191632/http://www.servicor.com/slidingcurtain.html>, 1 page.
United States Patent and Trademark Office, Notice of Allowance for U.S. Appl. No. 15/013,779, dated Jul. 3, 2017.
United States Patent and Trademark Office, Office Action for U.S. Appl. No. 15/013,779, dated Feb. 1, 2017.
Wilson Quality Safety Products, "Accordion Fold Curtains," Feb. 16, 2007 to Feb. 9, 2010, Internet Archive <http://web.archive.org/web/20070216072132/http://www.wilsonindustries.com/partitions-accordion_fold_curtains.htm>, 1 page.

* cited by examiner

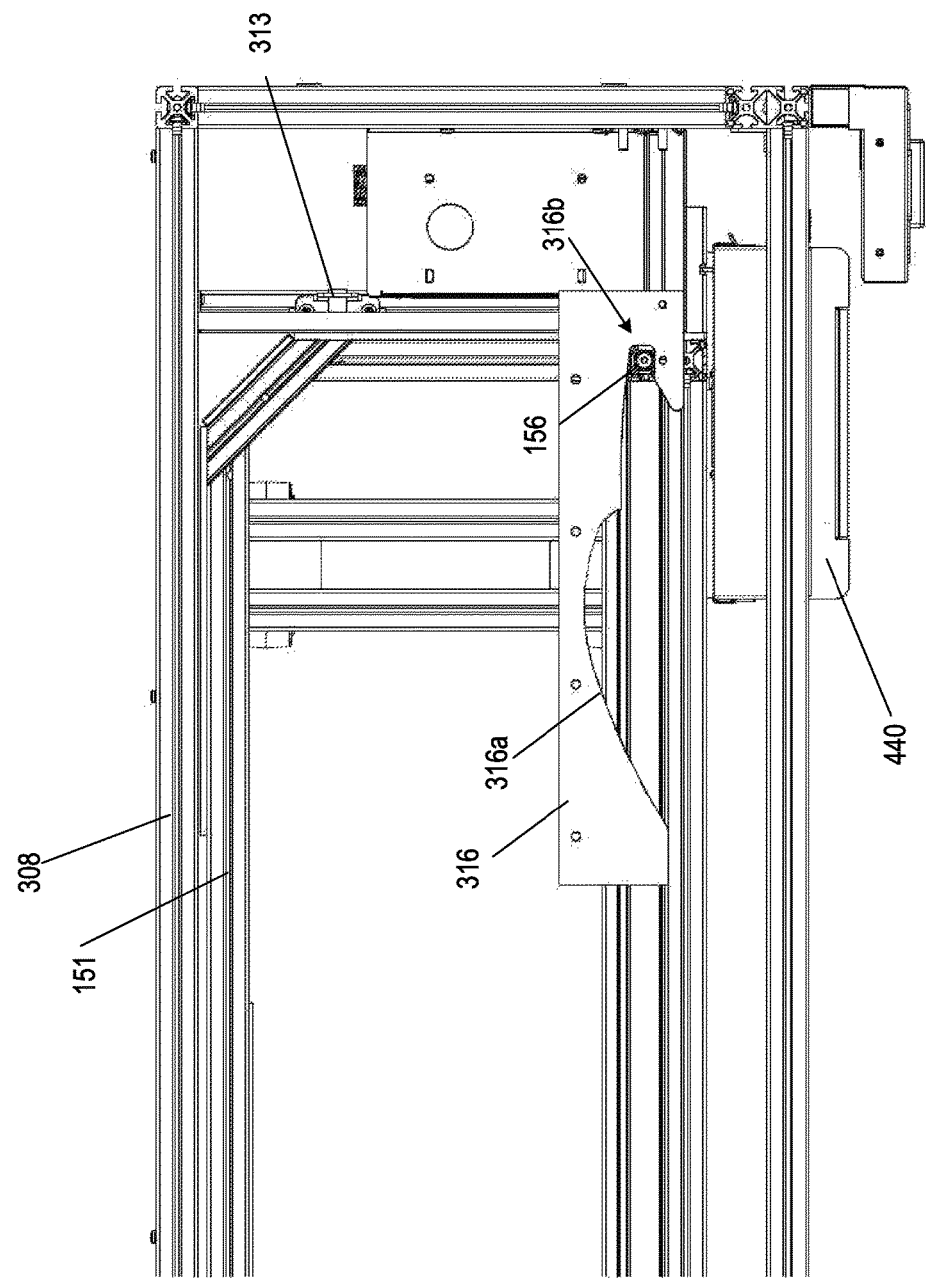

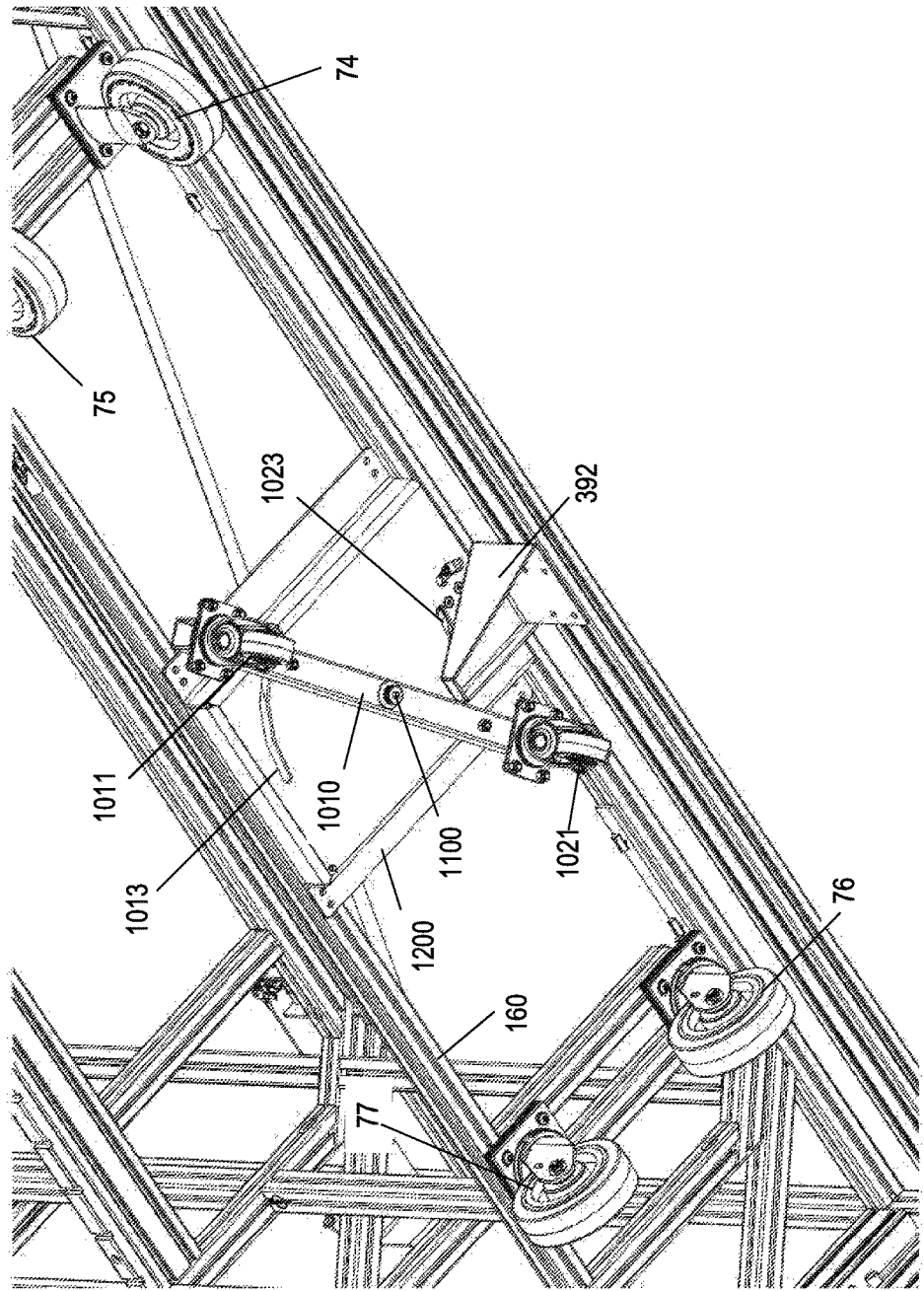

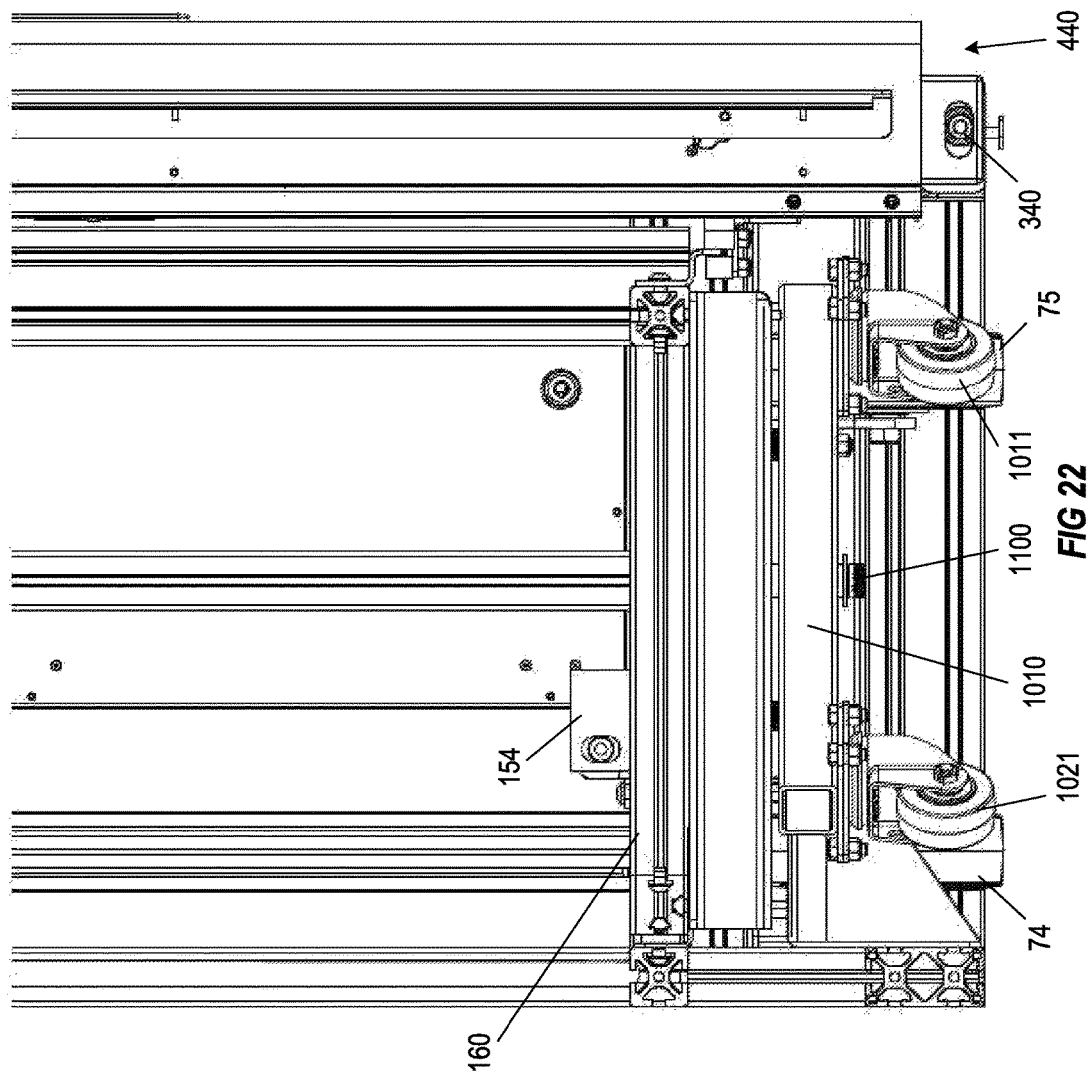

ITEM DISPENSING APPARATUS

CROSS-REFERENCE TO RELATED APPLICATIONS

This patent application is a continuation of U.S. application Ser. No. 15/013,779, filed on Feb. 2, 2016, which claims priority to U.S. Provisional Patent Application Ser. No. 62/110,972, filed Feb. 2, 2015, and entitled "Item Dispensing Apparatus" and U.S. Provisional Patent Application Ser. No. 62/148,120, filed Apr. 15, 2015, and entitled "Item Dispensing Apparatus," the contents of all of which are incorporated herein by reference in their entirety.

BACKGROUND

Field of the Invention

Various embodiments of the present invention described herein generally relate to item dispensers, and, in particular, to item dispensers configured to accept a cart having items stored therein and selectively grant access to at least a portion of the items stored in the cart.

Description of Related Art

Item dispensers are frequently used to dispense a variety of items, such as food products, toiletries, and other goods to various users. In the healthcare industry, dispensers are often placed in hospitals and used to distribute linens, surgical scrubs, and other healthcare items to members of a hospital's staff. These dispensers can be configured to store such items on shelves disposed within the dispenser, or on moveable carts that can be wheeled into an interior portion of a dispenser. To prevent access to the stored items, the dispensers may include a lockable access door that can be opened by an authorized user.

In various existing dispensers, such as those described in U.S. Pat. No. 6,502,718 entitled "Garment dispensing and receiving apparatus having a removable cart body and a flexible dispensing door," filed Sep. 19, 2002, authorized users may be granted access to a subset of items stored within a dispenser that are each stored within individual receptacles in the dispenser. Moreover, certain dispensers include various cart guide mechanisms for guiding a cart into an enclosure, such as those described in U.S. Pat. No. 7,874,562 entitled "Guides and other apparatus for inserting a cart, such as a cart with one or more fixed wheels, into an enclosure," filed Jul. 16, 2007 and claiming priority to application Ser. No. 11/744,387 (now U.S. Pat. No. 7,628,410), filed May 4, 2007.

However, there is an ongoing need in the art for secure dispensers that enable an authorized user to more easily access stored items while minimizing the initial assembly cost of the dispensers and maximizing security against unauthorized access to the stored items. Furthermore, in view of increasing efforts to reduce operational cost, there is also a need for dispensers that are easy to use, more reliable and that can be manufactured at a lower cost.

BRIEF SUMMARY

Various embodiments are directed to a system for dispensing items. In various embodiments, the system comprises: a cart comprising a cart body configured for storing one or more items and a dispenser. In various embodiments, the dispenser comprises: a housing defining an access opening and an interior portion dimensioned for receiving the cart; an access door disposed adjacent the access opening, the access door configured for movement between (i) a closed position in which the access door prevents access to the cart when the cart is stored within the interior area of the housing and (ii) an open position in which the access door permits access to the cart when stored within the interior area of the housing; and a cart guide mechanism comprising a rear guide rail extending along a rear portion of the housing and an angled guide rail extending between the rear portion of the housing and a first side portion of the housing; wherein the angled guide rail is configured to guide the cart to a desired position within the dispenser where a first side wall of the cart body is substantially adjacent to a second side portion of the housing opposite the first side portion, and a rear wall of the cart body is substantially parallel and adjacent to the rear horizontal guide rail.

In various embodiments, the cart comprises a cart locking member; and the cart guide mechanism comprises a cart locking mechanism configured to engage the cart locking member when the cart is stored at the desired position within the dispenser. Moreover, in certain embodiments, the cart body defines at least one chamfered vertical rear corner located between the rear wall of the cart body and a second side of the cart body, and the angled guide rail of the chamfered vertical rear corner is substantially adjacent and parallel to the angled guide rail when the cart is stored at the desired position within the dispenser. Moreover, in various embodiments, the cart further comprises at least one guide block having a hole extending at least partially therethrough, wherein the guide block is positioned proximate a first side of the cart body such that the hole extends in a direction parallel to the back wall of the cart; and the cart guide mechanism of the housing further comprises a guide pin, wherein at least a portion of the guide pin is configured to engage the hole of the guide block coupled to the cart when the cart is stored at the desired position within the dispenser. In certain embodiments, the cart comprises a cart locking member positioned along the rear wall of the cart body and proximate the second side of the cart body; and the cart guide mechanism comprises a cart locking mechanism configured to engage the cart locking member when the cart is stored at the desired position within the dispenser; and wherein the cart guide mechanism prevents unauthorized removal of the cart from the dispenser while the guide pin is engaged with the hole of the guide block and the cart locking mechanism is engaged with the cart locking member.

Moreover, in various embodiments, the cart further comprises at least one guide roller; and the dispenser further comprises at least one guide plate comprising at least one guide surface configured to engage the at least one guide roller; and wherein the at least one guide roller is configured to engage the at least one guide surface as the cart is directed into the interior of the housing in a first direction of travel and redirect the cart to a second direction of travel as the cart is directed into the interior of the housing. In certain embodiments, the at least one guide roller extends vertically above a top of the cart; and the at least one guide plate is positioned adjacent a ceiling of the housing. In certain embodiments, the at least one guide roller comprises a first guide roller and a second guide roller; and the at least one guide plate comprises a first guide plate comprising a first guide surface and a second guide plate comprising a second guide surface; and wherein the first guide roller is configured to engage and follow the first guide surface as the cart is directed into the interior of the housing in a first direction of travel and redirect the cart to a second direction of travel as the cart is directed into the interior of the housing; and the second guide roller is configured to engage and follow the second guide surface as the cart is directed out of the housing in a third direction of travel.

Moreover, in various embodiments, the access door comprises an item access mechanism configured to selectively provide access to a portion of the interior of the housing through at least one aperture extending through the item access mechanism, and wherein the item access mechanism is slidably coupled to the housing such that the item access mechanism is configured to slide laterally relative to the access opening. In certain embodiments, the item access mechanism comprises at least one slidable panel configured to reposition the at least one aperture vertically relative to the access opening. In certain embodiments, the cart comprises a guide rail extending across a front face of the cart; and the item access mechanism comprises a guide configured to slidably engage the guide rail of the cart.

In various embodiments, the dispenser further comprises a control system in communication with the item access mechanism, wherein the control system comprises: a user interface; and a processor configured to receive user input from the user interface, and to selectably grant access to a portion of the interior of the housing via the item access mechanism based at least in part on the user input.

In various embodiments, the housing further comprises a door locking mechanism configured to selectably lock the access door in the closed position.

In various embodiments, the first side portion of the housing comprises a first side panel and/or the second side portion of the housing comprises a second side panel.

Various embodiments are directed to a cart for storing one or more items. In various embodiments, the cart comprises: a cart body for storing one or more items, wherein the cart body defines a perimeter of the cart; a plurality of drive wheels secured relative to the cart body; and a retractable support base secured relative to the cart body, wherein the retractable support base comprises one or more outrigger members and one or more support wheels each secured proximate a distal end of a corresponding outrigger member, and wherein the retractable support base is adjustable between: an extended configuration in which the distal ends of the one or more outrigger members extend beyond the perimeter of the cart; and a retracted configuration in which the distal ends of the one or more outrigger members are positioned within the bounds of the cart's perimeter.

In various embodiments, the retractable support base is biased to the extended configuration. In certain embodiments, the retractable support base further comprises a latch mechanism configured to lock the retractable support base in the extended configuration. In various embodiments, the outrigger members are configured to rotate about a vertical axis of rotation between the extended configuration and the retracted configuration.

In certain embodiments, the outrigger members rotate between 50 and 55 degrees between the extended configuration and the retracted configuration. Moreover, in various embodiments, the outrigger members are offset relative to the axis of rotation.

The cart of claim 16, wherein the perimeter of the cart has a rectangular cross-section, having a long dimension and a narrow dimension perpendicular to the long dimension, and wherein the retractable support base is configured such that the outrigger members extend beyond the perimeter of the cart in a direction parallel to the narrow dimension while in the extended configuration.

Various embodiments are directed to a system for dispensing items. In various embodiments, the system comprises: a cart comprising a cart body configured for storing one or more items; and a plurality of drive wheels secured relative to the cart body; and a retractable support base secured relative to the cart body, wherein the retractable support base comprises one or outrigger members and one or more support wheels secured proximate a distal end of a corresponding outrigger member, and wherein the retractable support base is adjustable between: an extended configuration in which the distal ends of the one or more outrigger members extend beyond the perimeter of the cart; and a retracted configuration in which the distal ends of the one or more outrigger members are positioned within the perimeter of the cart; and a dispenser comprising: a housing defining an access opening and an interior portion dimensioned for receiving the cart; and a cart engagement mechanism configured to engage and pivot the retractable support base to the retracted configuration when the cart is inserted into the interior portion of the housing.

In various embodiments, the retractable support base is biased to the extended configuration. Moreover, in various embodiments, the retractable support base further comprises a latch mechanism configured to lock the retractable support base in the extended configuration; and the cart engagement mechanism comprises a latch release member configured to unlock the retractable support base such that the retractable support base is pivotable to the retracted configuration. In certain embodiments, the dispenser comprises a cart guide mechanism configured to guide the cart into the dispenser such that the cart engagement mechanism engages the retractable support base of the cart to pivot the retractable support base to the retracted configuration.

BRIEF DESCRIPTION OF THE SEVERAL VIEWS OF THE DRAWINGS

Reference will now be made to the accompanying drawings, which are not necessarily drawn to scale, and wherein:

FIGS. 7A-D shows perspective views of various cart guide mechanism of a dispenser according to one embodiment of the present invention.

FIGS. 14-22 show schematic diagrams of a cart having a retractable support base being inserted into a dispenser according to one embodiment of the present invention.

DETAILED DESCRIPTION

Figure 1:
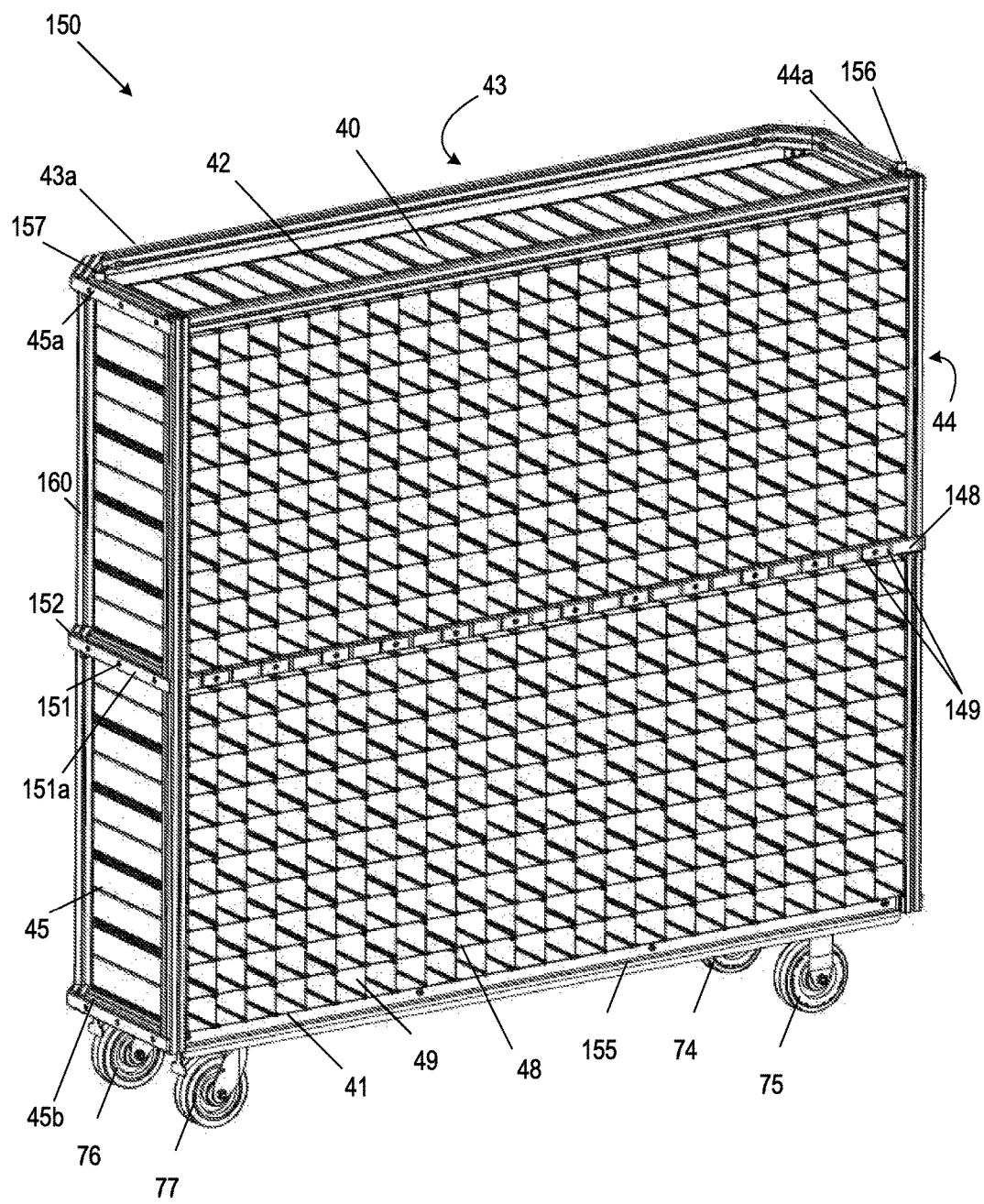
FIG. 1 shows a perspective view of a cart according to one embodiment of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

Various embodiments of the present invention are directed to a dispenser configured for storing one or more items and dispensing the stored items to authorized users. According to various embodiments, the dispenser generally includes a housing defining an interior portion dimensioned to receive a movable cart configured for supporting various items. As described in greater detail herein, the movable cart may comprise an array of receptacles each configured to accept at least one item therein, while the dispenser may comprise an item access mechanism configured to selectively provide access to a subset of these receptacles.

In order to provide selective access to the removable cart within the dispenser, various embodiments include a movable access door configured for being moved to an open position, in which a user has access unobstructed access to the movable cart within the dispenser such the cart may be removed from the dispenser, and a closed position, in which a user is prevented from removing the cart stored within the dispenser.

As described in greater detail herein, various embodiments of the dispenser's access door are configured to enable an authorized user to easily access the cart stored within the dispenser. For example, in various embodiments, the access door is configured to slide in a lateral direction relative to the dispenser's housing such that an authorized user can easily adjust the access door to the open or closed position. Moreover, as described in detail below, various embodiments of the dispenser include a door locking mechanism configured to prevent the movable access door from being moved away from the closed position.

Moreover, the access door may comprise one or more item access mechanisms configured to provide selective access to a subset of items stored within the movable cart. As a non-limiting example, the item access mechanism may comprise one or more item doors sized such that a user may be granted access to a single receptacle. While the access door is in the closed position, the item access mechanism may be configured to be positioned proximate one or more receptacles having items stored therein, and thus provide selective access to the items in the one or more receptacles.

As noted, the item access mechanisms may comprise one or more item doors sized to provide access to a selected subset of receptacles provided in the cart. Thus, the dispenser may include one or more cart guide mechanisms configured to guide the cart into the appropriate location within the dispenser to interact with the item access mechanisms, and to maintain the cart position within the dispenser during use. Thus, the dispenser may comprise one or more guide mechanisms, such as cart guide bars, configured to guide the cart into the dispenser while a user is placing a cart therein. Moreover, the dispenser may comprise a cart locking mechanism configured to interact with a cart locking member disposed on the cart, and thereby maintain the location of the cart within the dispenser.

In some embodiments, as described in greater detail below, the dispenser includes a movable security bar including a flexible joint located between the two ends of the security bar, one end of the bar being immovably coupled to dispenser and another end being detachably coupled to the dispenser when in its horizontal, closed position. The flexible joint of the security bar is configured to allow a user to move the security bar into a vertical position and thus grant unobstructed access to the interior of the dispenser.

These and other embodiments of the dispenser described herein are comprised of low-cost, reliable components that serve to improve reliability and reduce the overall manufacturing cost of the dispenser.

Item Supporting Cart

FIG. 1 illustrates a cart 150 configured to be inserted into a dispenser 7 according to one embodiment of the present invention. As shown in FIG. 1, the cart 150 includes an open faced body 40 defined by a cart frame 160 and a plurality of panels. In the illustrated embodiment, the cart frame 160 defines a perimeter of the cart 150, and additional components of the cart are disposed within the perimeter of the cart 150. The open faced body 40 has a number of panels, including a planar rectangular horizontal floor 41, a planar rectangular horizontal ceiling 42 that is parallel to and offset from the floor 41, a planar vertical rear wall 43 that extends between corresponding rear edges 43a, 43b of the floor 41 and the ceiling 42, a first planar rectangular side wall 44 that extends between corresponding first side edges 44a, 44b of the ceiling 42 and the floor 41, and a second planar rectangular side wall 45 that is parallel to and offset from the first side wall 44 and that extends between corresponding second side edges 45a, 45b of the ceiling 42 and the floor 41. The floor 41, ceiling 42, rear wall 43, and first and second side walls 44, 45 define an interior storage volume that is of suitable size to store a plurality of items to be dispensed from the dispenser 7. Moreover, referring briefly to FIG. 6, the cart 150 further comprises a weighted member 159 disposed proximate the cart floor's rear edge 43b. According to various embodiments, the weighted member 159 is configured to provide stability to the cart 150 during use by maintaining a low center of gravity and limiting the cart's ability to inadvertently tip over.

The cart 150 also includes a series of parallel horizontal divider members 48 extending from the first side wall 44 to the second side wall 45. As shown in FIG. 1, these horizontal divider members 48 are parallel to and offset from one another and provide a surface for supporting items stored within the cart's interior storage volume. The horizontal divider members 48 also serve to divide the individual rows of articles stored within the cart. As is also shown in FIG. 1, the cart 150 further includes a series of planar vertical divider members 49 that extend between the floor 41 and the ceiling 42 of the first open faced body 40. Like the horizontal divider members 48, the vertical divider members 49 are parallel to and offset from one another. The vertical divider members 49 serve to divide the individual columns of items stored within the cart 150.

As shown in the illustrated embodiment of FIG. 1, the horizontal and vertical divider members 48, 49 interact structurally to create a series of equally-sized receptacles having a square cross-section. These receptacles, which are accessible only through the front opening of the open-faced body 40, are used to store items before they are dispensed from the dispenser 7. However, in various other embodiments, the horizontal and vertical divider members 48, 49 may interact structurally to create a series of receptacles having various sizes and/or cross-sectional shapes (e.g., rectangular and/or square) and may have a non-linear profile in order to create circular or other non-planar cross-sectional receptacle shapes.

In the illustrated embodiment of FIG. 1, the cart 150 includes a plurality of wheels 74-77 disposed on the exterior surface of the floor 41 of the open-faced body 40 for supporting the cart 150 and for allowing the cart to be maneuvered relative to the interior of a housing 50 of the dispenser 7. In the illustrated embodiment of FIG. 1, a subset of the wheels 74-75 proximate a first side of the cart 44 are fixed, such that the wheels are configured to rotate in a direction parallel to the rear wall 43 of the cart. Moreover, a second subset of wheels 76-77 are configured to pivot about a vertical access extending through the center of each of the wheels to thereby facilitate redirection of the cart during movement thereof. As described in greater detail herein, the first side of the cart 150 is configured to be inserted into the housing 50 prior to the second side of the cart 150 being rotated into the housing 50 such that the entirety of the cart 150 is positioned within the housing 50. Thus, the pivotable wheels 76-77 located proximate the second side of the cart 150 facilitate such rotation of the cart into a fully-inserted position within the housing 50.

As illustrated in FIG. 1, the cart 150 further comprises a guide member configured to interact with a guide member of the dispenser, and thereby guide the cart 150 into the appropriate position within the dispenser. In the illustrated embodiment of FIG. 1, the guide member forms a portion of the cart frame 160, and various additional components of a guide mechanism may be attached to the cart frame 160. The guide member comprises a horizontal guide rail 151 comprising a portion located adjacent the back wall 43 of the cart 150, a portion located adjacent the first side wall 44 of the cart 150, and a portion located adjacent the second side wall 45 of the cart 150. The horizontal guide rail 151 is integrated into the cart frame 160, and includes low-friction guide strips 151a configured to facilitate sliding the horizontal guide rail 151 along the length of a corresponding horizontal guide rail 308 disposed on the back of the housing 50.

According to various embodiments, the low-friction guide strips 151a can be formed from ultra-high molecular weight polyethylene (UHMW).

Figure 6:
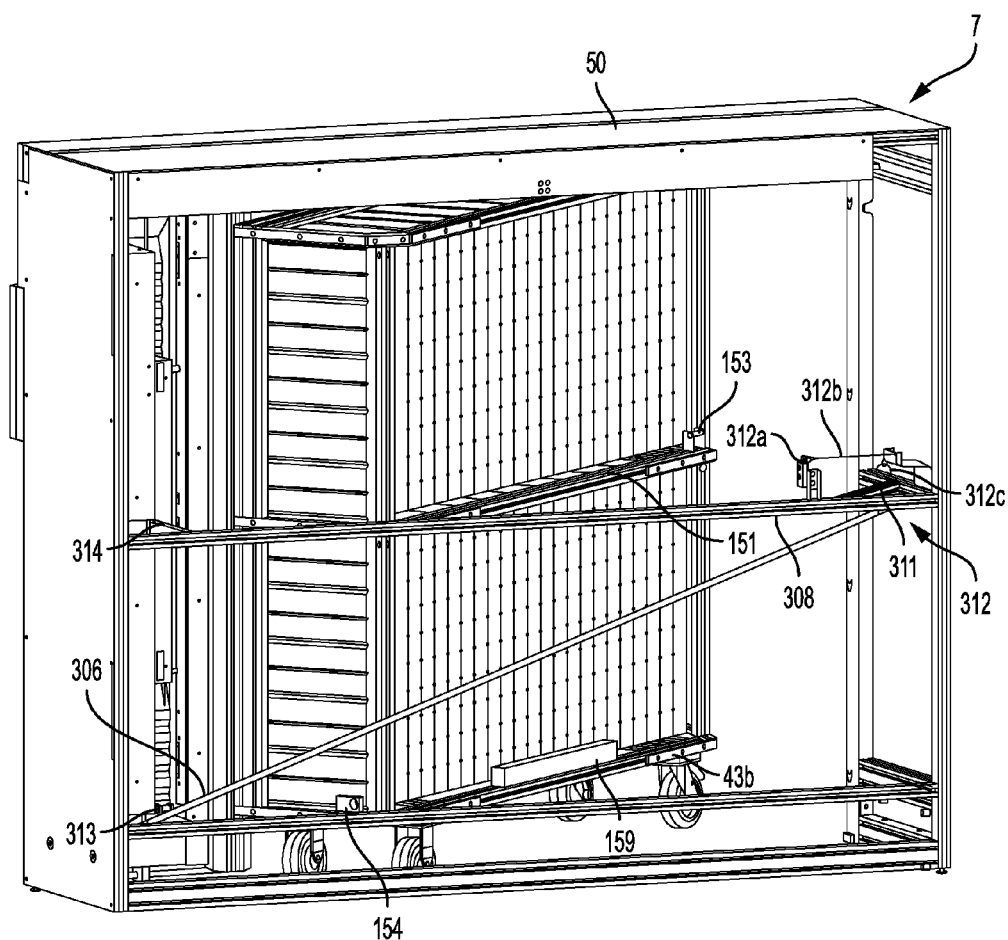
FIG. 6 shows a rear perspective view of a dispenser having a cart being guided into a housing according to one embodiment of the present invention.

In various embodiments, the horizontal guide rail 151 also includes a chamfered locator angle 152 proximate the second side of the cart 45, which is configured to interact with a corresponding angled guide rail 311 disposed within the housing 50 (shown in FIG. 6). As such, the cart frame 160 defines a substantially rectangular perimeter having at least one chamfered corner. As described in great detail below, the horizontal guide rail 151 is generally configured to slide relative to the angled guide rail 311 disposed within the housing 50, until the portion of the horizontal guide rail 151 disposed along the back of the cart is adjacent and parallel to the horizontal guide rail 308 of the housing 50. Upon the cart 150 reaching the acceptable position within the housing 50, the locator angle 152 of the cart 150 is adjacent and parallel to the angled guide rail 311 of the dispenser. In various embodiments, the horizontal guide rail 151 may comprise a second chamfered locator angle proximate the first side of the cart, and configured to facilitate placement of the cart 150 within the housing 50. As will be described in detail herein, when the cart 150 is positioned within the housing 50, the cart frame 160 may be in contact with a portion of the horizontal guide rail 308 and/or the angled guide rail 311.

According to various embodiments, the cart 150 also includes a cart locking member 153 (shown in FIG. 6) configured to interact with a cart locking mechanism 312 disposed on the housing 50 (shown in FIG. 6). In the illustrated embodiment, the cart locating member 153 is secured to the horizontal guide bar 151, and comprises a horizontally oriented cylindrical member suspended by a pair of support arms. In various embodiments, the cart locking member is configured to engage a cart locking mechanism 312 coupled to the housing 50 when the cart is fully inserted in the proper position within the dispenser 7. In the illustrated embodiment of FIG. 1 and FIG. 6, the cart locking member 153 is disposed within the cart perimeter and the locking mechanism 312 extends into the interior of the housing 50 to interact with the locking member 153. Thus, the locking mechanism 312 is configured to engage the locking member 153 while the horizontal guide rail 151 of the cart 150 is in contact with at least a portion of the horizontal guide rail 308.

As illustrated in FIG. 1, various embodiments of the cart 150 further comprise a pin guide block 154 defining a central aperture configured to accept a guide pin 313 coupled to the housing 50 and thereby guide the cart 150 into an appropriate position within the housing 50. Thus, as will be described in greater detail herein, when the cart 150 is positioned in the appropriate position within the housing 50, the guide pin 313 is positioned within the central aperture of the pin guide block 154 of the cart 150. The interaction between the guide pin 313 and the pin guide block 154 substantially prevents movement of the first side 44 of the cart 150 within the housing 50 in horizontal directions parallel to a cross-sectional plane of the guild bock's central aperture. Moreover, in the illustrated embodiment, the pin guide block 154 is disposed within the cart perimeter.

Thus, when the cart 150 is fully inserted in the proper position in the housing 50, the components of the cart guide mechanism interact with the corresponding components of the cart guide mechanism portion of the housing 50. As will be described in greater detail herein, the guide mechanism and the locking mechanism 312 are configured to selectively lock the cart in position such that the chamfered locator corner 152 of the cart 150 is in contact with the angled guide rail 311, a rear portion of the horizontal guide rail 151 of the cart 150 is in contact with the horizontal guide rail 308, and a side portion of the horizontal guide rail 151 of the cart 150 is in contact with a cart stop 314.

Figure 2A:
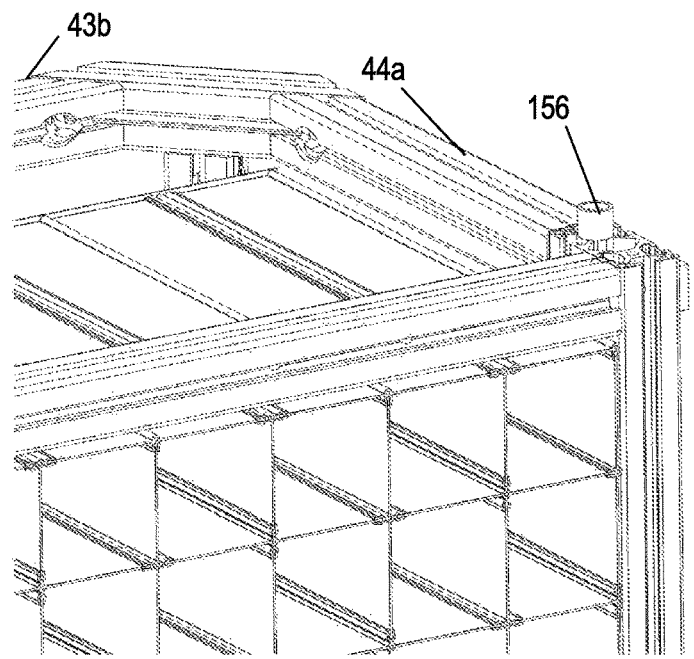
FIGS. 2A-2B show close-up perspective views of guide rollers according to one embodiment of the present invention.
Figure 2B:
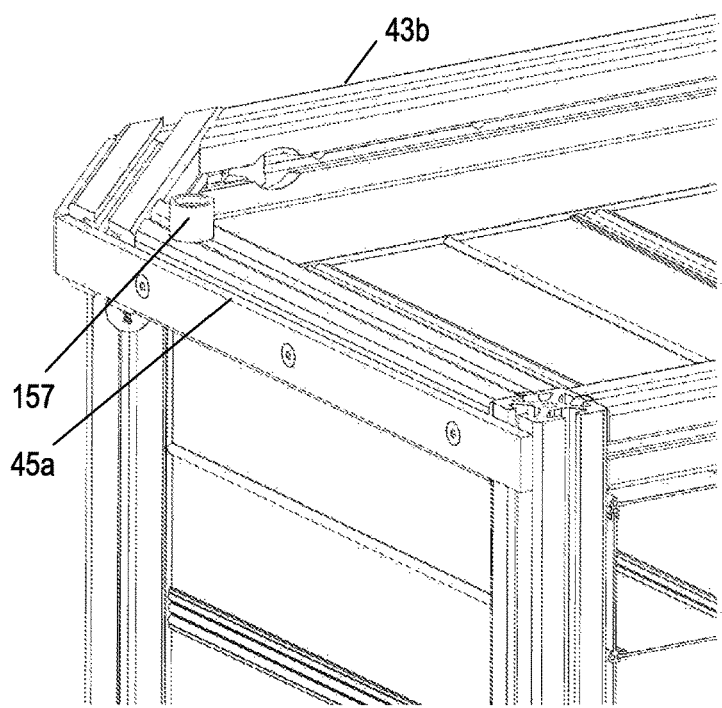

In the illustrated embodiment shown in FIGS. 1 and 2A-2B, the cart 150 further comprises a front guide roller 156 configured to engage a front placement guide 316, and a rear guide roller 157 configured to engage a rear placement guide 317 coupled to the housing 50. Each of the front guide roller 156 and rear guide roller 157 comprise a wheel configured to rotate about a vertical axis extending through the center of the roller. The guide rollers 156, 157 extend vertically from a ceiling 42 of the cart 150 such that the rollers 156, 157 engage placement guides 316, 317 proximate the top panel 304 of the housing 50. In the illustrated embodiment of FIGS. 2A and 2B, the guide rollers 156, 157 extend above the cart frame 160 such that the guide rollers 156, 157 are configured to engage corresponding placement guides coupled to the housing 50.

When in use, an item to be dispensed is placed within each of the cart's receptacles and the cart 150 is placed into the interior of the housing 50 so that the open front portion 46a of the body 40 is substantially co-planar with an access opening 110 of the dispenser's housing 50. As discussed in more detail below, this allows a control system 70 and item access mechanism 440 to control access to the interior of the receptacles.

Moreover, in the illustrated embodiment of FIG. 1, the cart 150 further comprises an item access mechanism guide rail 155 disposed along a bottom portion of cart. The item access mechanism guide rail 155 is configured to interact with an access mechanism guide 444 disposed on the item access mechanism 440 such that the item access mechanism 440 slides relative to the guide rail 155. Collectively, the item access mechanism guide 444 and guide rail 155 prevent unauthorized entry into the interior of the dispenser 7 by preventing a forward force applied on a bottom portion of the item access mechanism 440 from rotating the item access mechanism 440 about an upper portion of the item access mechanism. Upon application of such a forward force, a portion of the item access mechanism guide 444 contacts a portion of the item access mechanism guide rail 155, and thereby prevent forward movement of the bottom portion of the item access mechanism 440. As will be described in greater detail herein, the access mechanism guide 440 additionally comprises an anti-twist block 445 secured to an interior portion of the item access mechanism 440, and configured such that the anti-twist block 445 will engage a portion of the cart 150 upon the application of a horizontal force to a lower portion of the item access mechanism 440. Thus, the anti-twist block 445 functions with the guide 444 to prevent unauthorized access to the interior of the dispenser 7 by engaging a portion of the cart 150.

Additionally, in the illustrated embodiment of FIG. 1, the cart 150 further comprises a position guide bar 148 extending horizontally across the open face of the cart 150. The position guide bar 148 defines a plurality of recesses 149 at various lateral positions along the length of the position guide bar 148. As will be described in greater detail herein, each of the plurality of recesses corresponds to a particular vertical column of receptacles in the cart 150 such that a position locking mechanism of the item access mechanism 440 may engage one or more of the recesses 149 and thereby selectively lock the item access mechanism 440 in a desired lateral position relative to the cart 150.

Certain embodiments of the cart 150 may be configured with a relatively narrow width, where the width dimension is the measured as the distance between the front of the cart 150 (corresponding to the front of the open faced body 40) and the back of the cart 150 (corresponding to the back of the open faced body 40). In various embodiments, such a narrow body cart 150 may have a width of less than 24 inches. In a particular embodiment, the cart 150 has a width of approximately 18 inches. The cart may have a height, for example, of 70 inches or greater.

The cart 150 may be subject to various safety rules and/or regulations established by governmental entities and/or independent safety testing and certification organizations. For example, Underwriters Laboratories (UL) has established a safety certification test to determine whether carts (e.g., cart 150) and other dispensers are at risk of tipping over when subject to a force that causes at least a portion of the base of the cart to lose contact with a support surface. Such example standards are published as UL Standard 751, entitled "Vending Machine." The UL 751 standard requires inter alia that, under worst-case conditions in which only an upper portion of the cart is loaded, the loaded cart will not tip over when the cart is angled at 10 degrees relative to a horizontal support surface. Accordingly, when angled at 10 degrees relative to a horizontal support surface, the center of gravity of the cart 150 (unloaded or at least partially loaded) should remain over the base of the cart 150 defined by the wheels, such that the cart will return to an upright position when released.

Figure 2C:
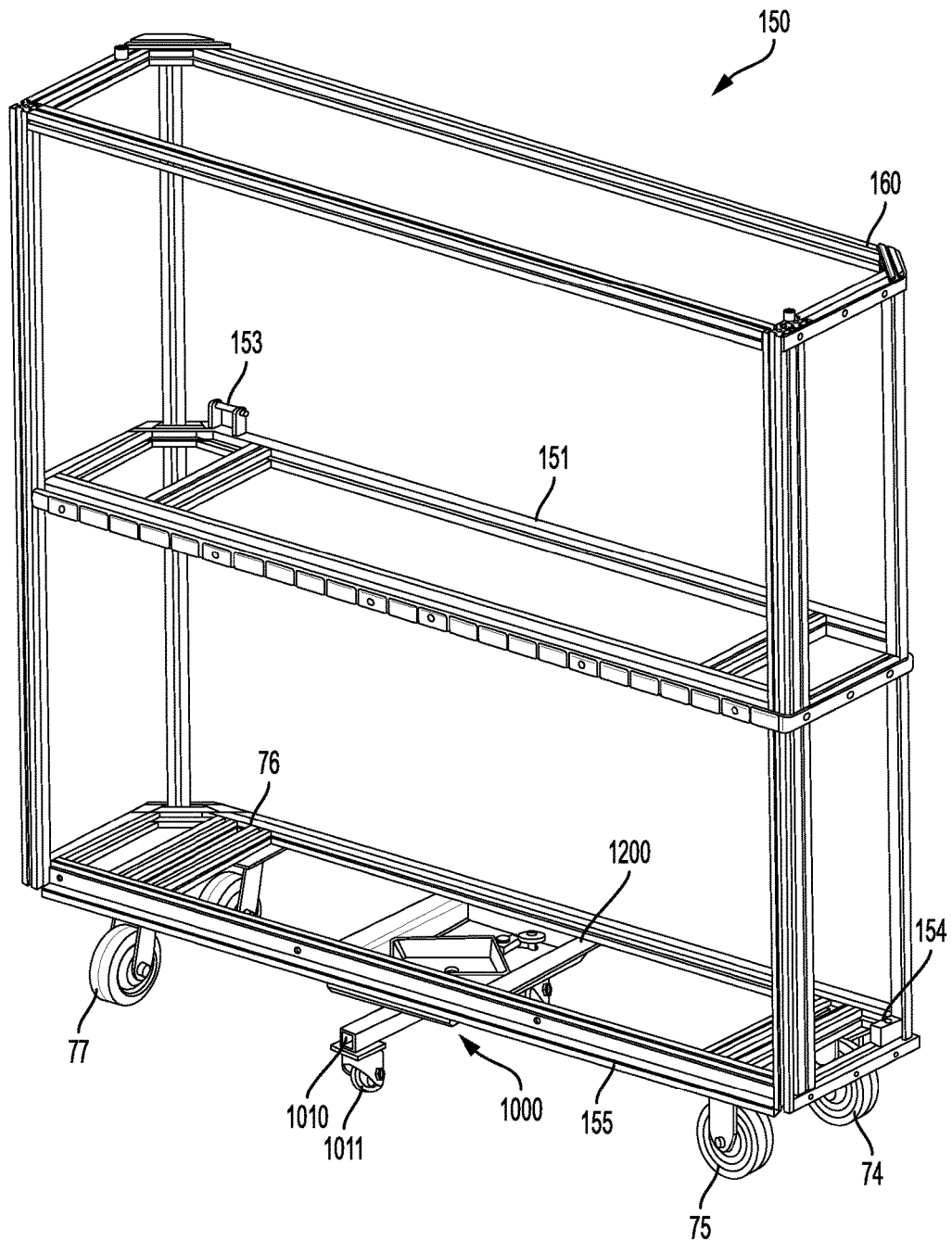
FIGS. 2C-2D show a cart having a retractable support base in an extended configuration according to one embodiment of the present invention.
Figure 2D:
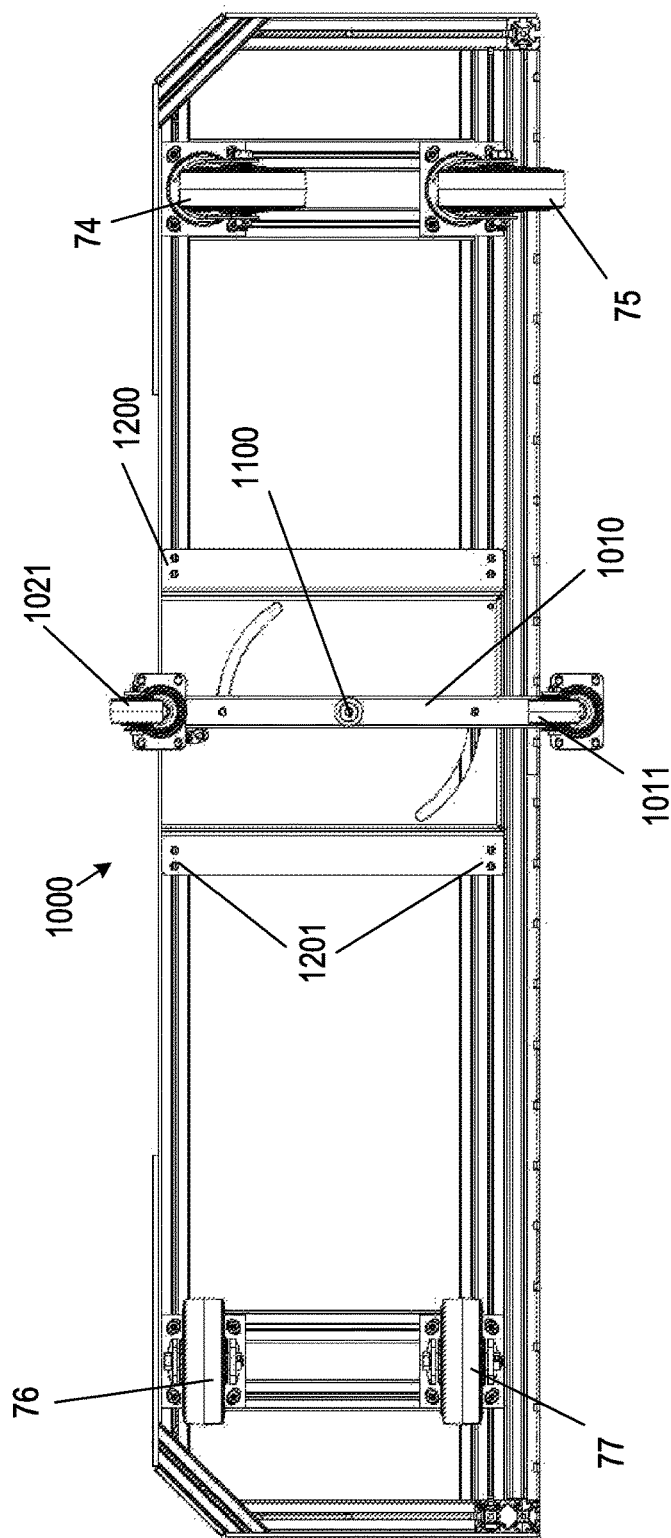
Figure 2E:
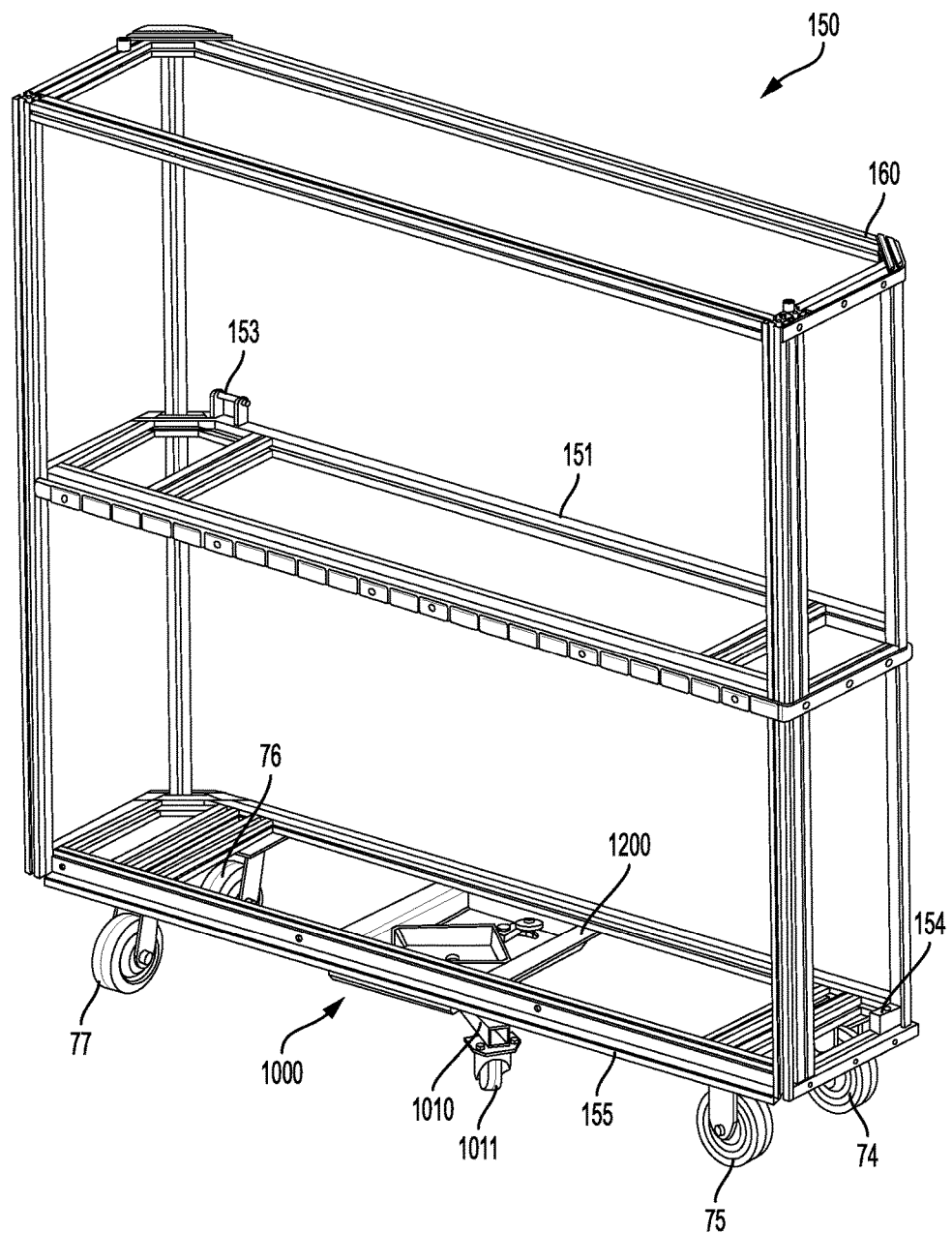
FIGS. 2E-2F show a cart having a retractable support base in a retracted configuration according to one embodiment of the present invention.
Figure 2F:
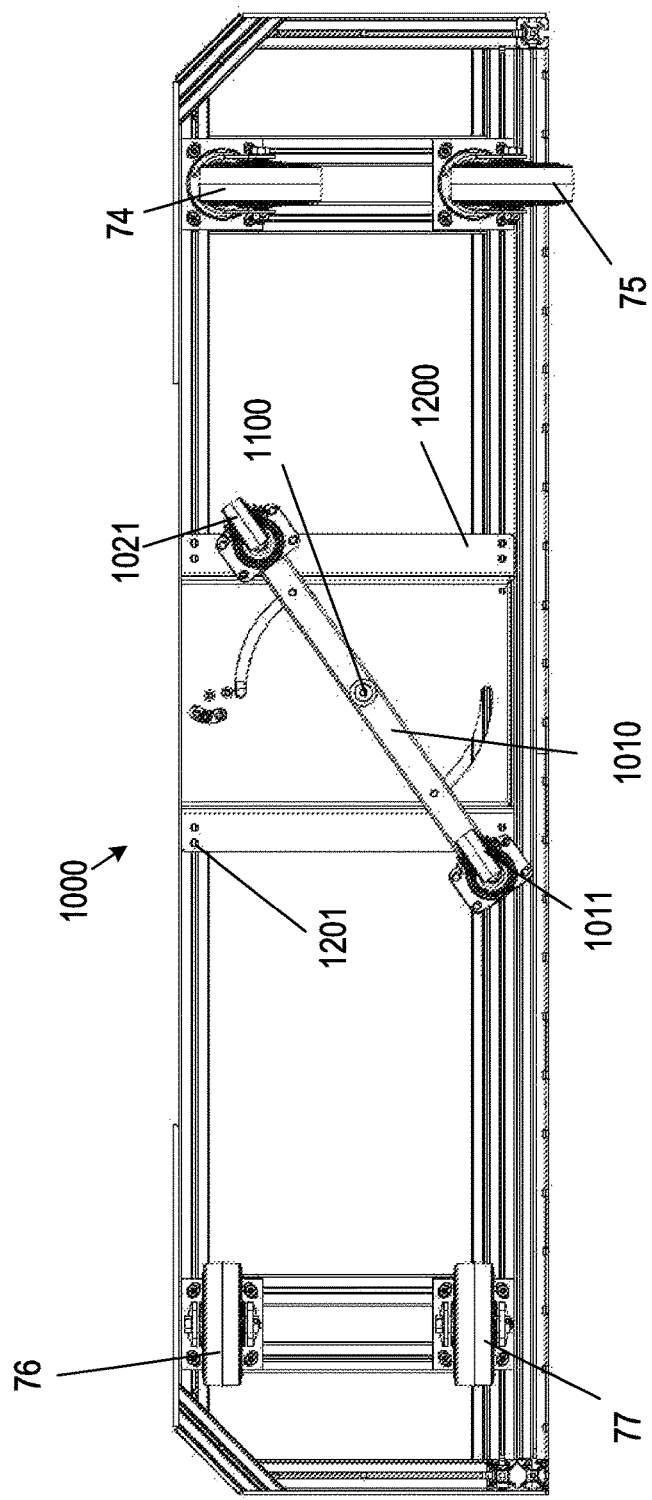

FIGS. 2C-2F illustrate one embodiment of the cart 150 in which a retractable support base 1000 is provided to selectively enlarge the effective base width of the cart 150. In the illustrated embodiment, the retractable support base 1000 is adjustable between an extended configuration and a retracted configuration as shown in FIGS. 2E-2F. In particular, with the retractable support base 1000 in the extended configuration, the stability of the cart 150 can be improved, thereby enabling the use of carts 150 having narrower widths while reducing the risk of tipping and ensuring compliance with the UL 751 standard.

As shown in FIGS. 2C-2D, the retractable support base 1000 is configured to expand the effective width of the base of the cart 150 beyond the width of the cart frame 160. FIG. 2D specifically provides a bottom view of a cart 150 with the retractable support base 1000 in the extended configuration. As shown in the configuration of FIG. 2D, a rotatable outrigger member 1010 of the retractable support base 1000 extends beyond the perimeter of the cart 150 in a direction substantially perpendicular to the front and back surfaces of the cart 150. As discussed in greater detail herein, in the illustrated embodiment, the front portion of the outrigger member 1010 and rear portion of the outrigger member 1010 extend beyond the perimeter of the cart 150 by different distances. To adjust the retractable support base 1000 to a retracted configuration (shown in FIGS. 2E-2F), the outrigger member 1010 is configured to rotate about a pivot axis 1100 such that the outrigger member 1010 no longer extends beyond the cart frame 160. In this retracted configuration, the cart base can be positioned completely within an interior portion of the housing 50 when the cart 150 is positioned within the dispenser 7. Thus, in the retracted position, the front portion of the outrigger member 1010 does not extend beyond the front portion of the cart 150 and out of the access opening 110 when the cart is positioned within the dispenser 7. Similarly, when in the retracted position, the back portion of the outrigger member 1010 does not extend beyond the back portion of the cart 150 and engage the rear portion of the housing 50 so as to interfere with the cart 150 being placed within the dispenser 7.

As shown in FIGS. 2E-2F, in the retracted configuration, the outrigger member 1010 can be rotated up to 90 degrees from the extended configuration such that the outrigger member 1010 and outrigger wheels 1011, 1021 (which are disposed at the front and back portions of the outrigger member 1010) are at least substantially within the perimeter of the cart 150 (as defined by the cart frame 160 and wheels 74-77). In various embodiments, the outrigger member 1010 is rotated between 45-90 degrees between the extended and retracted configurations and, in certain embodiments, is configured to rotate from 50-55 degrees between these configurations.

Figure 2G:
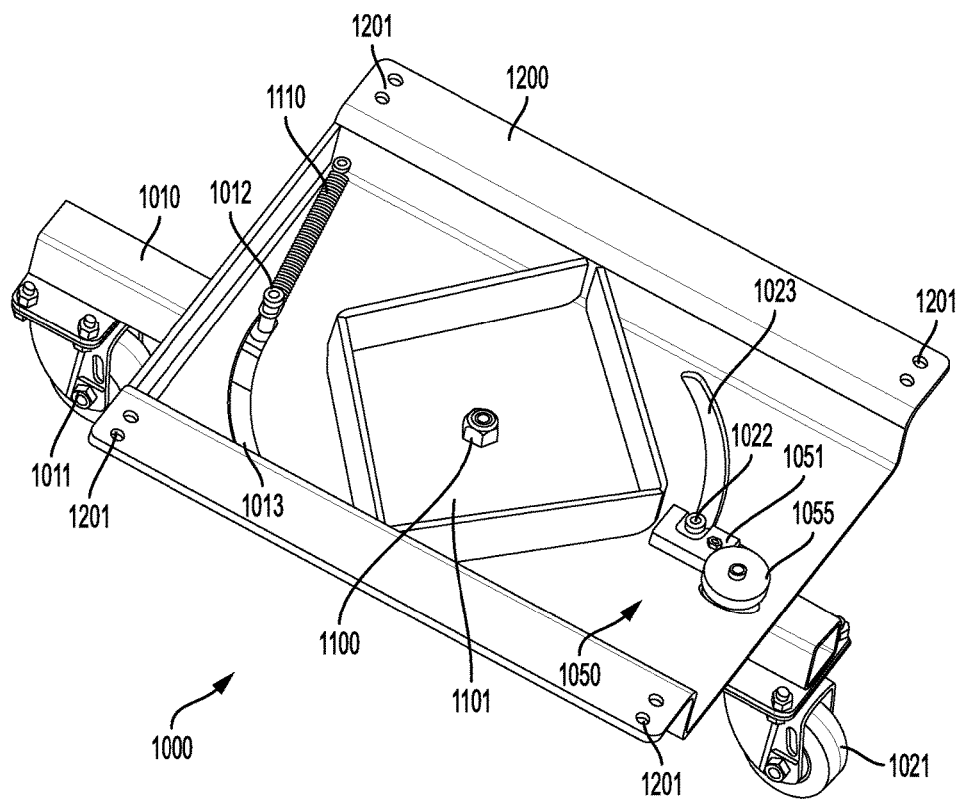
FIG. 2G shows a retractable support base in an extended configuration according to one embodiment of the present invention.
Figure 2H:
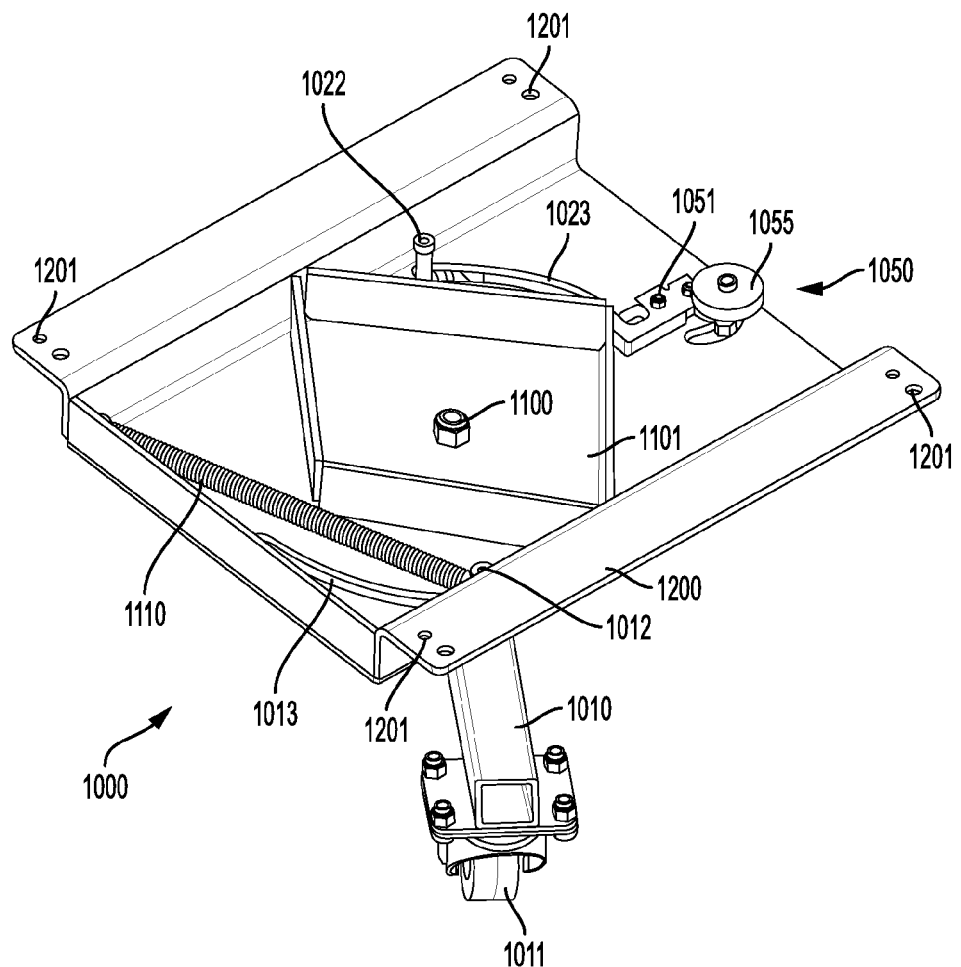
FIG. 2H shows a retractable support base in a retracted configuration according to one embodiment of the present invention.

FIGS. 2G-2H provide detailed views of the retractable support base 1000 detached from the cart 150. Referring first to FIG. 2G, which illustrates the retractable support base 1000 in an extended configuration, the retractable support base 1000 comprises a base frame 1200 having a plurality of cart attachment points 1201 positioned therein. For example, the plurality of cart attachment points 1201 may define fastener mounting points such that one or more fasteners (e.g., bolts) can be used to secure the retractable support base 1000 to the cart 150. In various embodiments the base frame 1200 may comprise a metal material (e.g., aluminum, steel, and/or the like), although other materials, such as plastic materials, composite materials, and/or the like may be utilized.

Referring again to FIG. 2G, the retractable support base 1000 further comprises an outrigger member 1010 rotatably secured to the base frame 1200. In various embodiments, the outrigger member 1010 may be an elongated member (e.g., a tube, beam, or the like) configured to rotate about a pivot axis 1100 extending vertically through the base frame 1200. For example, as shown in FIGS. 2D and 2F, the outrigger member 1010 comprises a single elongated member rotatably secured to the base frame 1200 such that the elongated member is configured to rotate about the pivot axis 1100 at a point between the front portion and the rear portion of the outrigger member.

As noted above, the front portion and the rear portion of the outrigger member 1010 are configured to extend beyond the front and rear of the cart frame 160 in the extended configuration to provide additional support to prevent the cart 150 from tipping. Accordingly, when the cart 150 is tipped at an angle of 10 degrees measured against the horizontal support surface in accordance with UL 751, the center of gravity of the cart 150 remains above the enlarged base of the cart 150, causing the cart to return to an upright position when released. As an example, in the extended configuration, the front portion of the outrigger member 1010 may extend at least 3 inches beyond the front edge of the cart frame 160, and the rear portion of the outrigger member may extend at least 2 inches beyond the rear edge of the cart frame 160. As shown in FIGS. 2E-2F and 2H, the outrigger member 1010 is configured to rotate such that the front and rear portions of the outrigger member are positioned completely within the perimeter of the cart 150 when the outrigger member is in the retracted configuration. Accordingly, the cart 150 may be positioned within the housing 50, and the outrigger member 1010 may be positioned such that it does not interfere with the functionality of other portions of the dispenser 7 (e.g., the use of the security bar 430 described in detail herein).

In various embodiments, the retractable support base 1000 additionally comprises a support plate 1101 adjacent the top surface of the retractable support base 1000. In various embodiments, the support plate 1101 provides additional support to the retractable support base 1000 proximate the pivot axis 1100 to prevent bending or flexing of the base frame 1200 during use.

Figure 2I:
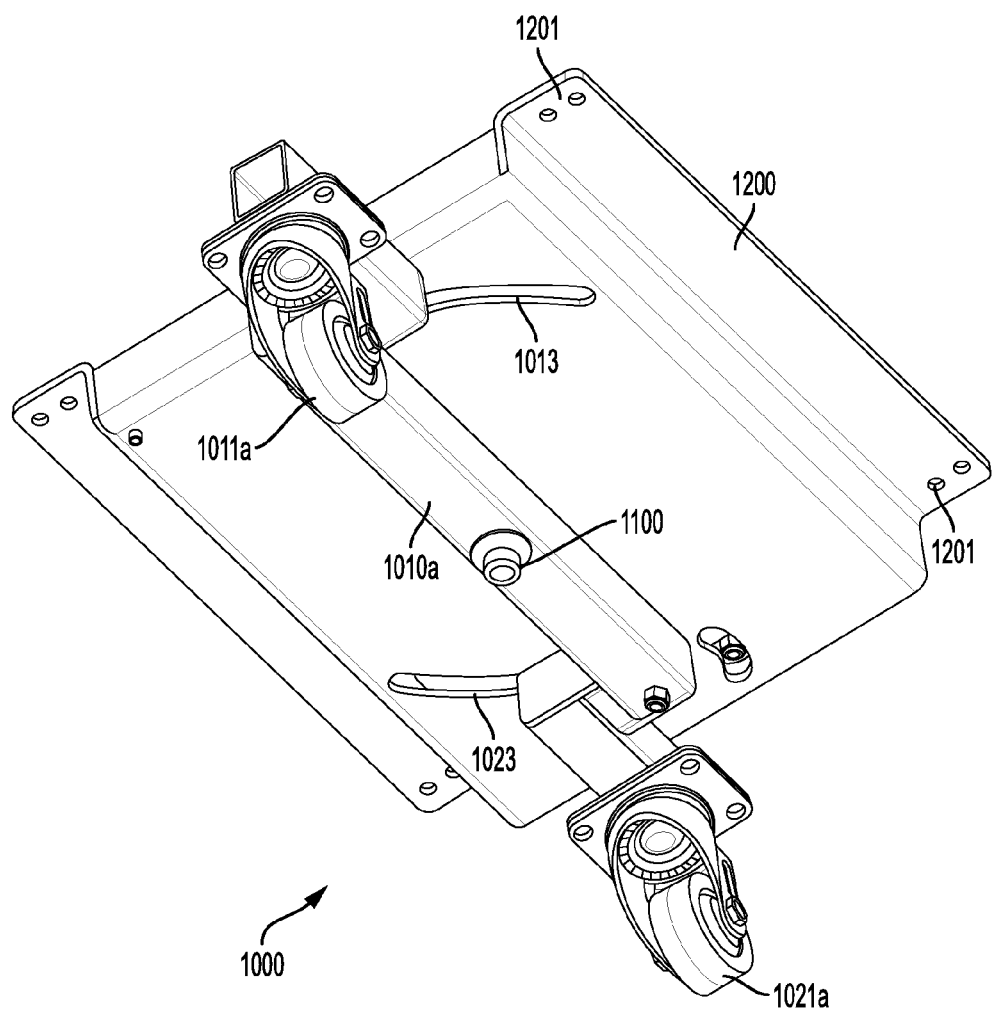
FIG. 2I shows a retractable support base in an extended configuration according to one embodiment of the present invention.

FIG. 2I illustrates an alternative outrigger configuration of a retractable support base 1000. As shown in FIG. 2I, an outrigger member 1010a is configured with an offset configuration to facilitate storage of a plurality of carts 150 in close proximity. For example, as shown in FIG. 2I, the outrigger member 1010a comprises an "L" shaped end portion, wherein a portion of the "L" shaped end portion is at least substantially parallel with a main portion of the outrigger member and wherein the outrigger wheels 1011a, 1021a are secured to an end portion of the "L" shaped end portion. Such an offset outrigger configuration permits two at least substantially identical carts 150 each having a retractable support base 1000 to be placed adjacent one another (both with their retractable support bases 1000 in an extended configuration) such that the front of a first cart 150 is immediately adjacent the back of a second cart 150 and the sides of the carts are at least substantially aligned. In such an adjacent configuration, the front portion of the outrigger member 1010a of the first cart 150 is beside the rear portion of the outrigger member 1010a of the second cart 150. At least a portion of the front outrigger member 1010a of the first cart 150 and the rear portion of the outrigger member 1010a of the second cart may extend under the opposite cart, and the outrigger members of the first cart and the second cart are at least partially nested.

Referring again to FIG. 2G, each of the front portion and the rear portion of the outrigger member 1010, have a wheel 1011, 1021 secured thereto. In various embodiments, each of the wheels 1011, 1021 be configured to rotate about a vertical axis extending through the wheel 1011, 1021 such that the direction of travel of the wheel may correspond to the direction of travel of the cart 150. Moreover, in various embodiments, the wheels 1011, 1021 may be positioned such that the bottom edge of the wheels 1011, 1021 do not contact a horizontal support surface when all of the wheels 74-77 are in contact with the horizontal support surface. In various embodiments, at least one of the outrigger wheels 1011, 1021 may be configured to contact a horizontal support surface when the cart 150 is tipped at an angle less than 10 degrees. In a particular embodiment, at least one of the outrigger wheels contacts the horizontal support surface when the cart 150 is tipped at an angle of less than 5 degrees. Such a configuration ensures that the wheels 1011, 1021 of the retractable support base 1000 do not impede movement of the cart 150 during normal operation.

In the illustrated embodiment of FIG. 2G, each of the front portion and rear portions of the outrigger member 1010 additionally comprise a stability pin 1012, 1022. As shown in FIG. 2G, the stability pin 1012, 1022 extends vertically from the outrigger member 1010 and through a pin guide channel 1013, 1023 in the base frame 1200. As shown in FIG. 2G, the pin guide channels 1013, 1023 have an arcuate shape corresponding to the travel path of the corresponding stability pin 1012, 1022 when the outrigger member 1010 rotates between the extended configuration of FIG. 2G and the retracted configuration shown in FIG. 2H.

In various embodiments, the outrigger member 1010 may be biased to an extended configuration to provide an enlarged and stable base for the cart 150 when the cart 150 is being moved by a user. Accordingly, the retractable support base 1000 further comprises an outrigger biasing mechanism configured to bias the outrigger member 1010 to the extended configuration. For example, as shown in FIG.

2G, the biasing system comprises a return spring 1110 secured to a portion of the base frame 1200 and to the stability pin 1012 of the front portion of the outrigger member 1010 corresponding to the front of the cart 150. As shown in FIG. 2H, the return spring 1110 is configured to stretch and impart a return force on the stability pin 1012 when the outrigger member 1010 is rotated away from the extended configuration, and to thereby bias the outrigger member 1010 to the extended configuration.

Moreover, the retractable support base 1000 may include a latch mechanism 1050 configured to selectably lock the outrigger member 1010 in the extended configuration. In the illustrated embodiment of FIG. 2G, the latch mechanism 1050 comprises a mechanically actuated latch 1051 configured to engage the stability pin 1022 corresponding to the rear of the outrigger member 1010 and thereby prevent the stability pin 1022 from rotating toward the retracted configuration. In various embodiments, the mechanically actuated latch 1051 may be configured to disengage the support pin 1022 in response to a force applied to a release device 1055. For example, as will be described in greater detail herein, the release device 1055 may be configured to engage a corresponding latch release member 391 on the housing 50, and thereby release the support pin 1022 such that the outrigger member 1010 may rotate to the retracted configuration while the cart 150 is inserted into the housing 50. In various embodiments, the latch 1051 and release device 1055 may comprise any suitable commercially available latch and release mechanism.

Dispenser Housing Configured to Receive an Item Supporting Cart

Figure 3:
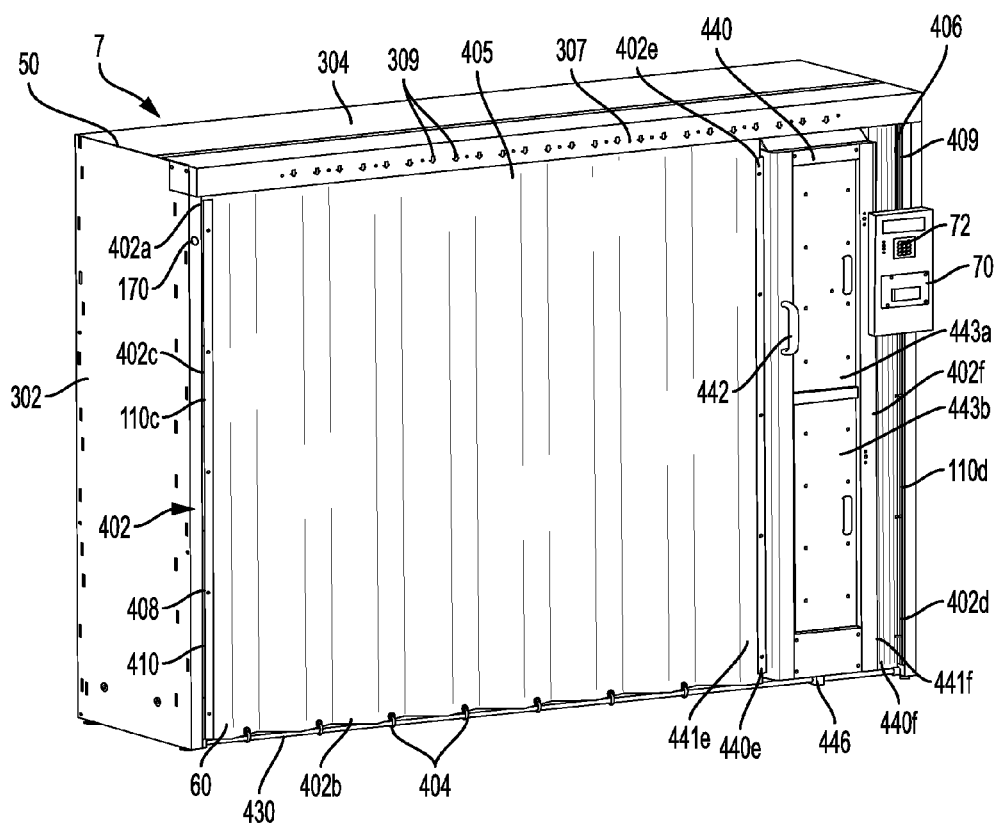
FIG. 3 shows a perspective view of a dispenser having an access door in a closed position according to one embodiment of the present invention.
Figure 4:
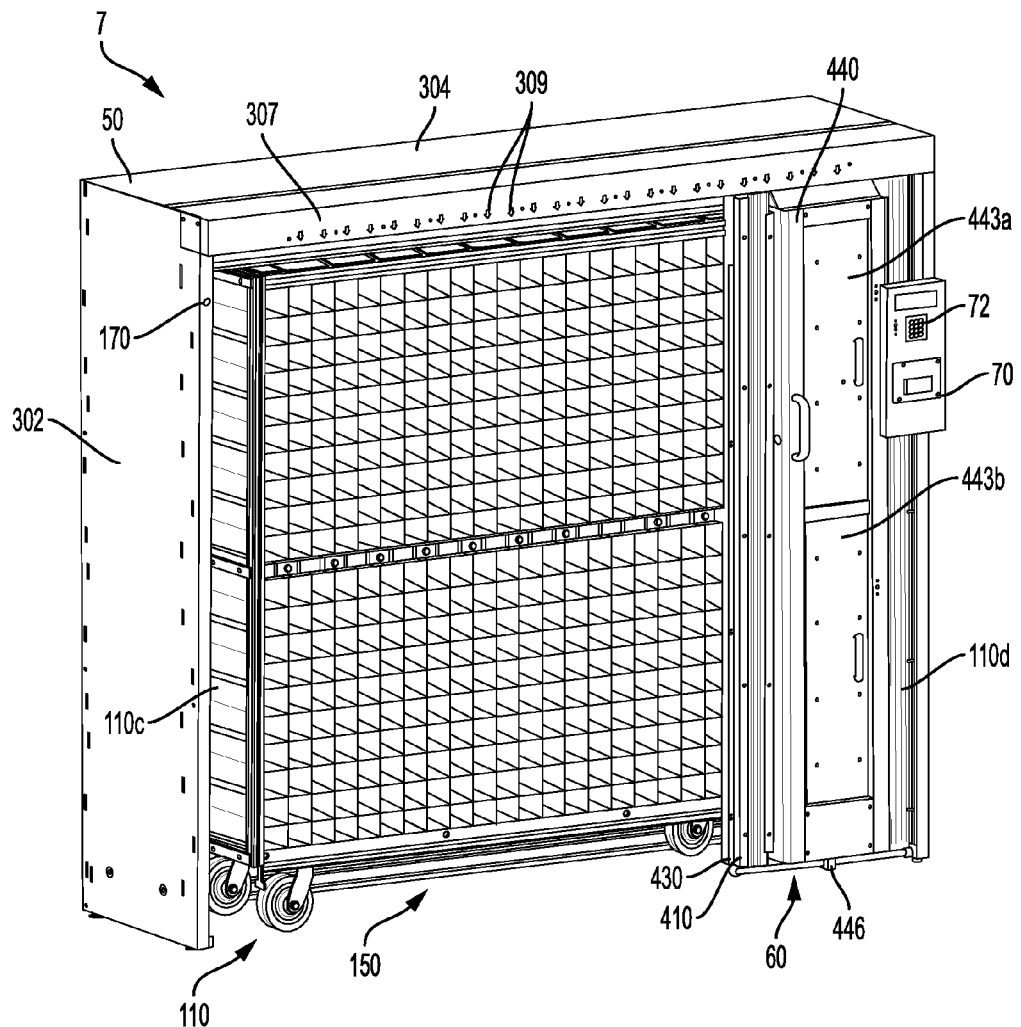
FIG. 4 shows a perspective view of a dispenser having an access door in an open position such that a cart may be maneuvered into the dispenser according to one embodiment of the present invention.
Figure 5:
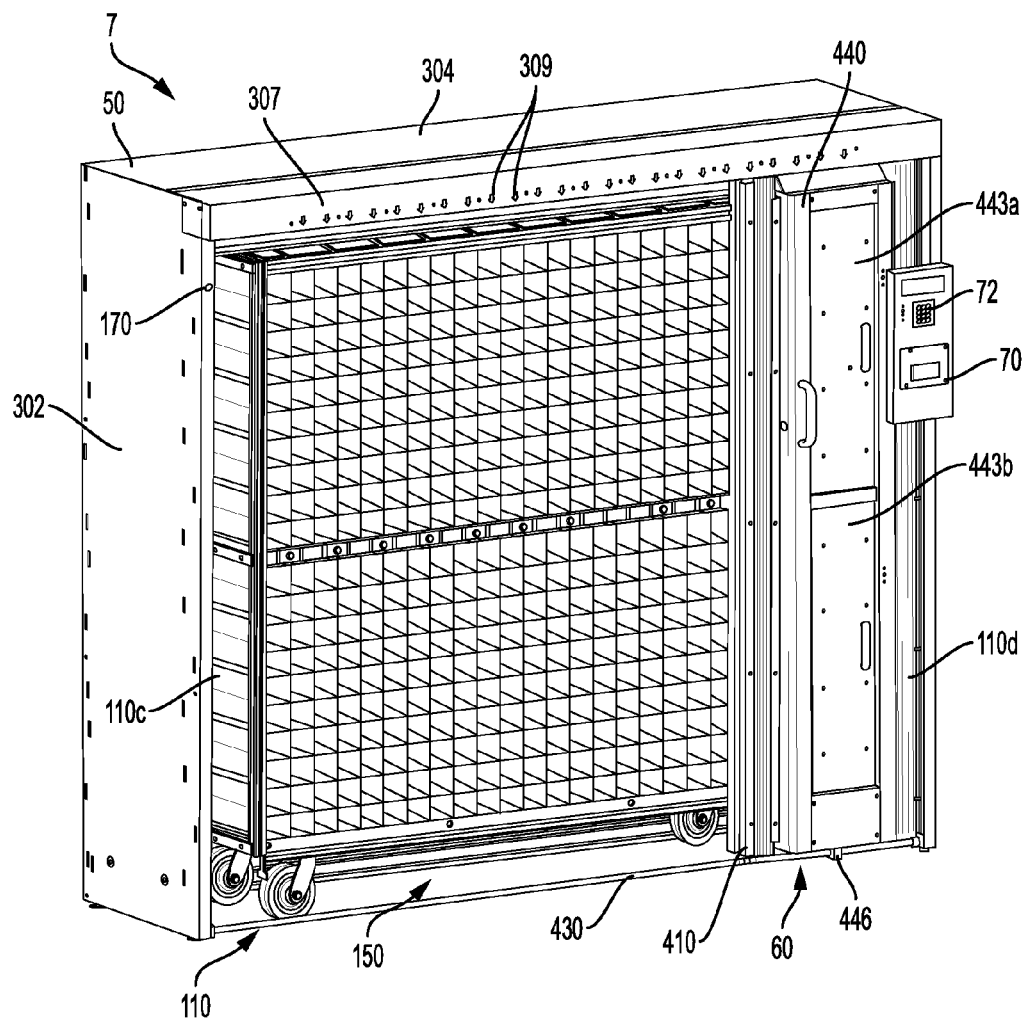
FIG. 5 shows a perspective view of a dispenser having an access door in an open position and a security bar in closed position according to one embodiment of the present invention.

FIGS. 3-5 illustrate a dispenser 7 according to one embodiment of the present invention. As shown in FIG. 3, the dispenser 7 generally includes a housing 50, an access door 60, and a control system 70. The access door 60 is configured to slide laterally relative to the housing 50 in order to prevent or permit access to an interior portion of the housing 50. However, as shown in FIG. 4, the housing 50 includes a partially open lower perimeter configured to permit a movable storage cart 150 to be moved into and out of the housing 50. Accordingly, the access door 60 is operatively connected to the housing 50 along its upper edge 402a, and is secured to a security bar 430 along its lower edge 402b. To restrict access to authorized users only, the dispenser comprises one or more door locking mechanisms 170 generally configured to lock and unlock the access door 60 based on input received from a user (e.g., via a mechanical key, and/or via user input provided to the control mechanism 70).

In the illustrated embodiment of FIG. 3, the housing 50 includes a pair of side panels 302, an upper panel 304, a rear cross bar 306 (shown in FIG. 6), and a cart guide mechanism. In the illustrated embodiment of FIG. 3, the side panels 302 define a first side portion and a second side portion of the housing, and the rear cross bar 306 (or rear panel, as discussed herein) defines a rear portion of the housing. The side panels 302, the upper panel 304, and the rear cross bar 306 may be formed from any suitable structural material (e.g., metal or high-strength plastics). The side panels 302, the upper panel 304, and the rear cross bar 306 may comprise separately connected components, or may be formed from a single piece of shaped structural material. Similarly, components of the cart guide mechanism (e.g., rear horizontal guide rail 308) may be formed from any suitable structural material (e.g., metal or high-strength plastics), and may comprise various separately connected components. When placed such that the rear of the housing is adjacent to a wall or other vertical surface at least as large as the housing 50, the components 302-306 define an interior portion accessible through an access opening 310. In the illustrated embodiment, the housing's interior portion is dimensioned for receiving a movable storage cart 150 configured for supporting various items. In various embodiments, the upper panel 304 can be replaced with an upper frame extending over the entire top of the housing or a substantial portion thereof. Moreover, in various embodiments, the rear cross bar 306 can be replaced with a rear panel that covers all or substantially all of the back of the housing.

As illustrated in FIGS. 3-4, the security bar 430 is adjustable between a retention position, in which the security bar 430 prevents a movable storage cart 150 from being moved into or removed from the interior area of the housing 50, and an access position, in which the security bar 430 does not prevent the moveable storage cart 150 from being moved into or removed from the interior area of the housing 50. For example, FIG. 4 shows the dispenser 7 with its security bar 430 in an access position, while FIGS. 3 and 5 show the dispenser 7 with its security bar 430 in a retention position.

According to various embodiments, the dispenser's access door 60 is operatively connected to the housing 50 adjacent the housing's access opening 310, and comprises a flexible barrier 402, a vertical support member 410, and an item access mechanism 440. In various embodiments, the access door 60 is configured to slide laterally between an open position, in which the access door 60 permits access to the entirety of the interior portion of the housing 50, and a closed position, in which the access door 60 prevents access to the entirety of the interior portion of the housing 50, and only the item access mechanism 440 may allow access to a portion of the interior of the housing 50. For example, FIG. 3 illustrates the access door 60 in a closed position, while FIG. 4 illustrates the access door 60 in an open position according to one embodiment. In the illustrated embodiments, the access door's flexible barrier 402 may comprise a fabric sheet made of a tear-resistant material (e.g., ballistic nylon, polyester, Kevlar® fabric). However, the flexible barrier may be formed from any flexible material of suitable durability and strength. Moreover, the access door's vertical support member 410 is generally rigid and comprised of a high-strength material, such as steel or aluminum. However, as will be appreciated from the description herein, the vertical support member 410 may be comprised of various materials of suitable strength and rigidity. As used herein, the terms "vertical" and "horizontal" are intended to refer to components oriented generally vertically or generally horizontally. Although such components may be oriented exactly vertically or horizontally with respect to a support surface, the terms vertical and horizontal are not intended to indicate that such an exact orientation is required.

Although not shown, the upper edge 402a of the flexible barrier 402 is operatively connected to the housing 50 by a first plurality of door attachment members (e.g., a first set of openings extending through the flexible barrier, and/or a first set of rings). FIG. 3 shows an exterior view of an upper portion of the flexible barrier 402. In various embodiments, a first set of rings are disposed along the flexible barrier's upper edge 402a and are engaged with an upper horizontal support member comprising an upper horizontal guide rod. In the illustrated embodiment of FIGS. 3-5, the upper horizontal support member is positioned behind an upper front panel 307 of the housing 50, such that a user is unable to fit a hand between the upper front pane 307 and the horizontal support member, and thereby access the interior of the housing 50. Moreover, the item access mechanism 440 may be slidably secured to the horizontal support member. For example, the item access mechanism 440 may comprise an upper bushing (not shown) secured to an upper portion of the item access mechanism 440 and configured to slidably couple the item access mechanism 440 to the housing 50.

As shown in FIG. 3, a first side edge 402c of the flexible barrier 402 is attached to the vertical support member 410. In particular, in the illustrated embodiment of FIG. 3, the flexible barrier's first side edge 402c is clamped between a C-shaped attachment member 408 secured to the vertical support member 410. However, as will be appreciated from the description herein, the flexible barrier's first side edge 402c can be attached to the vertical support member 410 with various other attachment devices or methods (e.g., using an adhesive or a plurality of fastening devices).

In addition, the second side edge 402d of the flexible barrier is attached to the housing 10 adjacent the second lateral side 110d of the access opening 110. As shown in FIG. 3, the flexible barrier's second side edge 402d is clamped between a C-shaped attachment member 409 secured to the housing 50 along the access opening's second lateral side 110d. However, as will be appreciated from the description herein, the flexible barrier's second side edge 402d can be attached to the housing 50 with various other attachment devices or methods (e.g., using an adhesive or a plurality of fastening devices).

Moreover, as illustrated in FIGS. 3-5, a first intermediate side 402e and second intermediate side 402f of the flexible barrier are attached to opposite sides of the item access mechanism 440. As shown in FIG. 3, the first and second intermediate sides 402e, 402f of the flexible barrier are each clamped between a respective C-shaped attachment member 441e, 441f secured to the item access mechanism along a first and second vertical side 440e, 440f of the item access mechanism 440.

In various embodiments, the vertical support member 410 is configured to slide laterally relative to the housing 50 in order to permit the access door 60 to move between its open and closed positions. The vertical support member 410 may be slidably connected to the housing 50 at its upper end by an upper sliding assembly configured to slide along the upper horizontal support member. In various embodiments, the lower end of the vertical support member 410 is slideably connected to a lower security bar 430. As shown in FIGS. 3-4, the access door 60 can be moved to its open position while the lower security bar 430 remains in its retention position. As will be appreciated from FIG. 5, with the lower security bar 430 in its access position and the access door 60 in its open position, the security bar 430 does not obstruct the dispenser's access opening 110 and user access to the interior portion of the housing 50 is permitted (e.g., such that a storage cart 150 can be wheeled into the dispenser 7 and one or more items can be placed on or removed from the storage cart 150).

The security bar 430 includes a movable joint located between the two ends of the security bar 430. The movable joint allows the security bar 430 to be moved between the retention and access positions. In various embodiments, the movable joint may comprise a universal joint. The security bar 430 is generally rigid and composed of a high-strength metal material, such as steel or aluminum. However, as will be appreciated from the description herein, the security bar 430 may be composed of various materials of suitable strength and rigidity.

In certain embodiments, the lower edge 402b of the flexible barrier 402 is operatively connected to the lower security bar 430 by a second plurality of door attachment members (e.g., a second set of rings 404). As shown in FIG. 3, the second set of rings 404 are disposed along the flexible barrier's lower edge 402b and are engaged with the lower security bar 430. Accordingly, the flexible barrier 402 is secured to the housing 50 by the upper attachment members engaging the upper horizontal support member and the second set of rings 404 engaging the security bar 430, such that the flexible barrier 402 extends substantially across the height of the access opening 110 and is laterally movable between the aforementioned open and closed positions. Similarly, the lower end of the item access mechanism 440 may be slidably secured to the security bar 430. For example, a lower bushing 446 may be coupled to a lower portion of the item access mechanism 440 and may slidably secure the item access mechanism 440 to the security bar 430.

As will be appreciated from FIG. 3, with the lower security bar 430 in its retention position and the access door 60 in its closed position, the lower security bar 430 substantially prevents unauthorized users from lifting or otherwise tampering with the bottom edge of the access door's flexible barrier 402.

In the open position shown in FIG. 5, the vertical support member 410 is moved laterally toward the access opening's second lateral side 110d. With the vertical support member 410 moved to the open position shown in FIG. 5, the flexible barrier 402 is compressed into a plurality of folds and the item access mechanism 440 is positioned proximate the second lateral side 110d of the access opening, and collectively the components of the flexible barrier 402 do not obstruct access to the interior portion of the housing 50 through the access opening 110.

According to various embodiments, the aforementioned components of the access door 60 enable the access door 60 to be easily moved by a user between the open and closed positions of FIGS. 3 and 4, and allow selective access to a portion of the interior of the housing 50 via the item access mechanism 440.

In various embodiments, the dispenser 7 includes a door locking mechanism 170 configured to lock the access door 60 in its closed position. For example, in the illustrated embodiment of FIGS. 3-5, the door locking mechanism 170 is secured to a portion of the housing 50 adjacent the access opening's first lateral side 110c. In the illustrated embodiment, the door locking mechanism 170 includes at least one latch positioned within a portion of the housing and configured to engage a corresponding at least one door locking member supported on the vertical support member 410. In particular, the door locking mechanism 170 is configured such that, when the access door 60 is moved to its fully closed position as shown in FIG. 3, the door locking mechanism's latch engages the door locking member and prevents the access door 60 from being moved out of its closed position. As a non-limiting example, the door locking mechanism may comprise an upper latch positioned proximate the upper perimeter of the access opening 110 and a lower latch positioned proximate the lower perimeter of the access opening 110. Each of the upper latch and the lower latch are configured to engage a corresponding upper locking member and lower locking member coupled to the vertical support member 410.

To unlock the access door 60 from its closed position, the door locking mechanism 170 disengages its at least one latch from the at least one door locking member. In various embodiments, this can be accomplished automatically or manually. For example, in certain embodiments, a keyed mechanism may be provided that enables a user to insert a key into a keyhole provided on the housing 50 and disengage the door locking mechanism's at least one latch by turning the key. In addition, a lever or button mechanism configured to mechanically disengage the at least one latch may be used.

In other embodiments, the dispenser's control system 70 may be configured to control the door locking mechanism 170. In various embodiments, the control system 70 comprises a computing device (e.g., a processor and memory) configured to interface with one or more user input devices disposed on the exterior of the housing (e.g., a keypad, a card reader, an RFID reader, and/or the like). For example, in the illustrated embodiment of FIGS. 3 and 4, the control system 70 is contained in a small housing proximate an exterior face of one of the dispenser side panels 302 and includes a user interface 72 comprising a keypad, a card reader, and a display screen.

In various embodiments, the door locking mechanism 170 may include a solenoid or other electromechanical device configured to actuate the locking mechanism's latches in response to a control signal received from the control system 70. Thus, in one embodiment, the control system 70 is configured to actuate the door locking mechanisms' latches to unlock the closed access door 60 in response to receiving valid user input (e.g., a card swipe from a card assigned to an authorized user, or an authorization code entered via the key pad). By preventing the access door 60 from being unlocked by a user unable to provide such valid user input, the control system 70 and locking mechanism 170 are able to prevent access to items stored in the interior portion of the housing 50. In certain embodiments, the locking mechanism 170 may also include the aforementioned mechanical unlocking system as a redundant back-up method for unlocking the access door 60 when the automated control system 70 fails. As will be appreciated from the description herein, various embodiments of the door locking mechanism 170 may include various locking mechanisms suitable for securing the access door 60 in its closed position.

In the illustrated embodiment of FIG. 3, the access door 60 comprises an item access mechanism 440. As illustrated, the item access mechanism 440 is disposed within the access door 60 between a first portion of the flexible barrier 405 and a second portion of the flexible barrier 406. Thus, when the access door 60 is in the closed position, the combination of the first portion of the flexible barrier 405, the second portion of the flexible barrier 406, and the item access mechanism 440 cover the entirety of the access opening 110 such that access to the interior of the dispenser 50 is prevented. Moreover, each of the first portion of the flexible barrier 405 and the second portion of the flexible barrier 406 may be configured such that each portion may, individually, at least substantially cover the access opening 110. Thus, as the item access mechanism 440 is moved between the first side of the access opening 110c and the second side of the access opening 110d, as will be described herein, the first portion of the flexible barrier 405 and the second portion of the flexible barrier 406 collectively prevents access to the interior of the housing 50.

Moreover, as illustrated, a side of the first portion of the flexible barrier 405 and a side of the second portion of the flexible barrier 406 are secured to first and second sides of the item access mechanism 440, respectively. Each of the first and second portion of the flexible barrier may be secured to the item access mechanism 440 using mechanisms similar to those described herein as securing the flexible barrier 402 to the housing 50 and the vertical guide bar 410.

In the illustrated embodiment, the item access mechanism 440 is configured to be moved laterally relative to the access opening 110. As shown in FIGS. 3-5, the item access mechanism 440 comprises a handle 442, such that a user may manually reposition the item access mechanism 440 during use. Moreover, in various embodiments, the item access mechanism 440 further comprises a position locking mechanism (not shown), such that when the item access mechanism 440 is positioned in a desired lateral position, the position locking mechanism may be engaged and thereby prevent the item access mechanism 440 from being moved away from the desired lateral position. In various embodiments, the position locking mechanism may comprise a solenoid configured to selectively extend a locking member into one of the recesses 149 defined along the position guide bar 148 of the cart 150. For example, the position locking mechanism may comprise a position locking mechanism as described in commonly owned U.S. patent application Ser. No. 14/042,612, entitled "Item Dispensing Apparatus," filed on Sep. 30, 2013, which is incorporated herein by reference in its entirety.

As will be described in greater detail herein, the desired lateral position is indicated to a user via one or more position indicator lights 309 disposed in the dispenser (e.g., on the upper front panel 307). According to various embodiments, the position indicator lights 309 may be—for example—a marking (e.g., a printed arrow) or a light (e.g., an arrow-shaped light illuminated by an LED). As illustrated, each of the plurality of indicator lights 309 corresponds to a vertical column of receptacles in the cart 150, and indicates a desired lateral position determined by the control system 70 to a user. Thus, as illustrated the plurality of indicator lights 309 indicates a lateral position of the item access mechanism 440 to the user. As will be described in greater detail herein, once the user moves the item access mechanism 440 to the indicated lateral position (e.g., a lateral position at which an alignment indicator on the item access mechanism (not shown) is aligned by an illuminated indicator light 309), the item access mechanism 440 may be locked in position by the position locking mechanism.

As illustrated, the item access mechanism 440 comprises an upper item access door 443a and a lower item access door 443b. Thus, the upper item access door 443a is configured to selectively grant access to at least one receptacle located in a upper portion of the cart 150 (as will be described in greater detail herein), and the lower item access door 443b is configured to selectively grant access to at least one receptacle located in a lower portion of the cart 150. In the illustrated embodiment of FIGS. 3-5, the height and vertical location of the upper item access door 443a correspond at least substantially with the height and vertical location of the upper portion of the cart 150, and the height and vertical location of the lower item access door 443b correspond at least substantially with the height and vertical location of the lower portion of the cart 150.

The upper item access door 443a may comprise an access panel and a receptacle selection mechanism comprising a movable panel having an aperture therein. In various embodiments, the aperture is sized such that, when the aperture is aligned with a subset of receptacles in the cart, a user may be provided access to the subset of receptacles through the aperture, but no adjacent receptacles. For example, the aperture is sized at least substantially the same as the access opening of a receptacle, such that when the aperture is aligned with the access opening of the receptacle, a user is provided access to the entirety of the receptacle such that an item stored therein may be removed from the receptacle through the aperture.

The movable panel may be configured to move vertically, such that the aperture may be aligned with a horizontal row of receptacles. Thus, when the item access mechanism 440 is aligned horizontally relative to the access opening of the dispenser such that the aperture is aligned horizontally with a receptacle, a user may be provided access to a single receptacle through the upper access door 443a.

In various embodiments, the access panel is configured to be locked and thus prevent a user from opening the access panel to access the aperture until the item access mechanism 440 is positioned laterally at the desired lateral location and locked in the desired lateral location, and the moving panel of the upper access door 443a is positioned such that the aperture is aligned with a determined receptacle in the cart. Thus, a user may be prevented from opening the access panel until the aperture is aligned with a determined receptacle.

The lower item access door 443b may have a configuration at least substantially similar to that described above in reference to the upper item access door 443a. Thus, the lower item access door 443b may comprise an access panel and a movable panel having an aperture therein, wherein the movable panel is configured to move vertically and thereby align the aperture with a horizontal row of receptacles in the cart 150. As described above in reference to the upper item access door 443a, the access panel of the lower item access door 443b may be configured to remain locked until the item access mechanism 440 is positioned laterally at the desired lateral location and locked in the desired lateral location, and the moving panel of the lower item access door 443b is positioned such that the aperture is aligned with a determined receptacle in the cart 150. Thus, when the item access mechanism 440 is aligned horizontally relative to the access opening 110 of the dispenser 50 such that the aperture is aligned horizontally with a receptacle, a user may be provided access to a single receptacle through the lower access door 443b.

In various embodiments, the movable panel of the item access mechanism 440 may comprise a selector mechanism provided behind the access doors 443a, 443b, such as that described in U.S. patent application Ser. No. 14/042,612. Thus, the selector mechanism may be configured to restrict access to only certain receptacles of the cart 150. For example, the selector mechanism may comprise a vertically moveable plate configured to slide vertically relative to the item access mechanism 440. The plate may comprise an upper edge attached to a flexible upper barrier and a lower edge attached to a flexible lower barrier. The plate may define an upper aperture and a lower aperture each dimensioned such that a user can access an item disposed within a receptacle through one of the apertures.

Collectively, the upper item access door 443a and the lower item access door 443b are configured to provide access to a subset of items stored in the upper portion of the cart 150 and to a subset of items stored in the lower portion of the cart 150. As a non-limiting example, the item access mechanism 440 may be configured to provide a user with access to a shirt stored in a receptacle in the upper portion of the cart 150 and pants stored in a receptacle in the lower portion of the cart 150.

In various embodiments, the item access mechanism 440 is in communication with the control system 70 such that the control system 70 can provide instructions to the item access mechanism 440 regarding one or more receptacles to be accessed by a user. The control system 70 is then configured to instruct the item access mechanism 440 to move the movable panel of the upper item access door 443a to a desired vertical location; to move the movable panel of the lower item access door 443b to a desired vertical location; and to lock the item access mechanism 440 in a desired lateral location.

Cart Engagement Mechanism

Figure 7A:
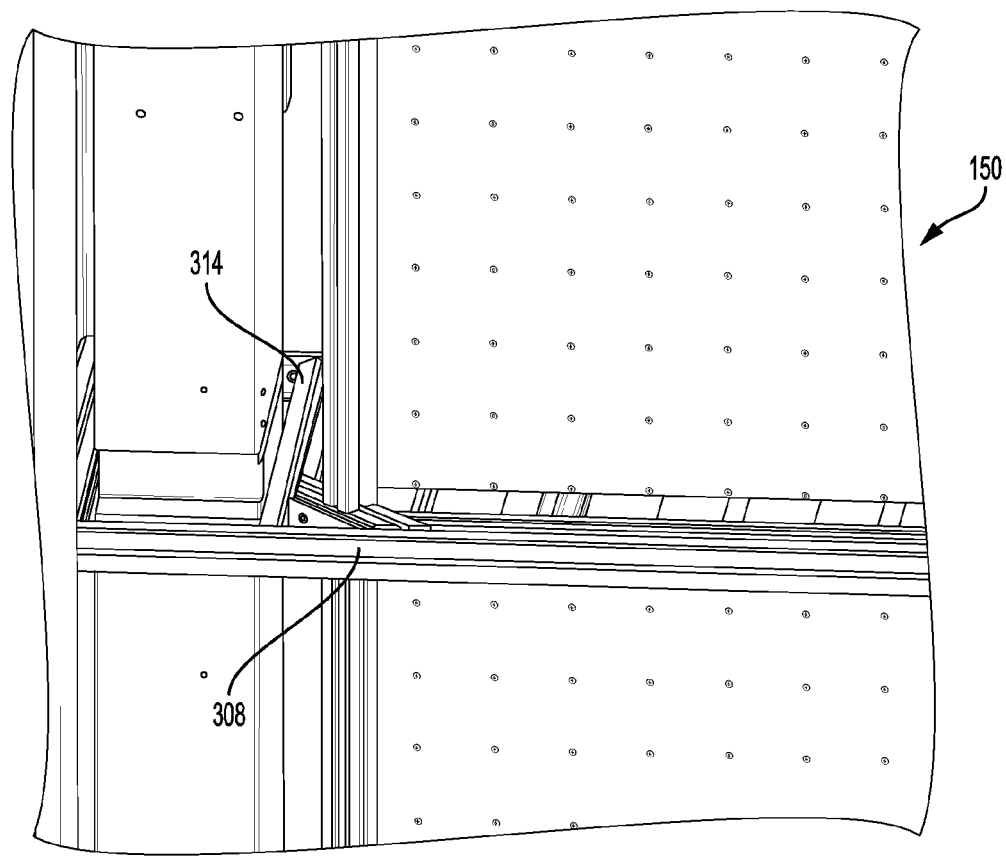
Figure 7B:
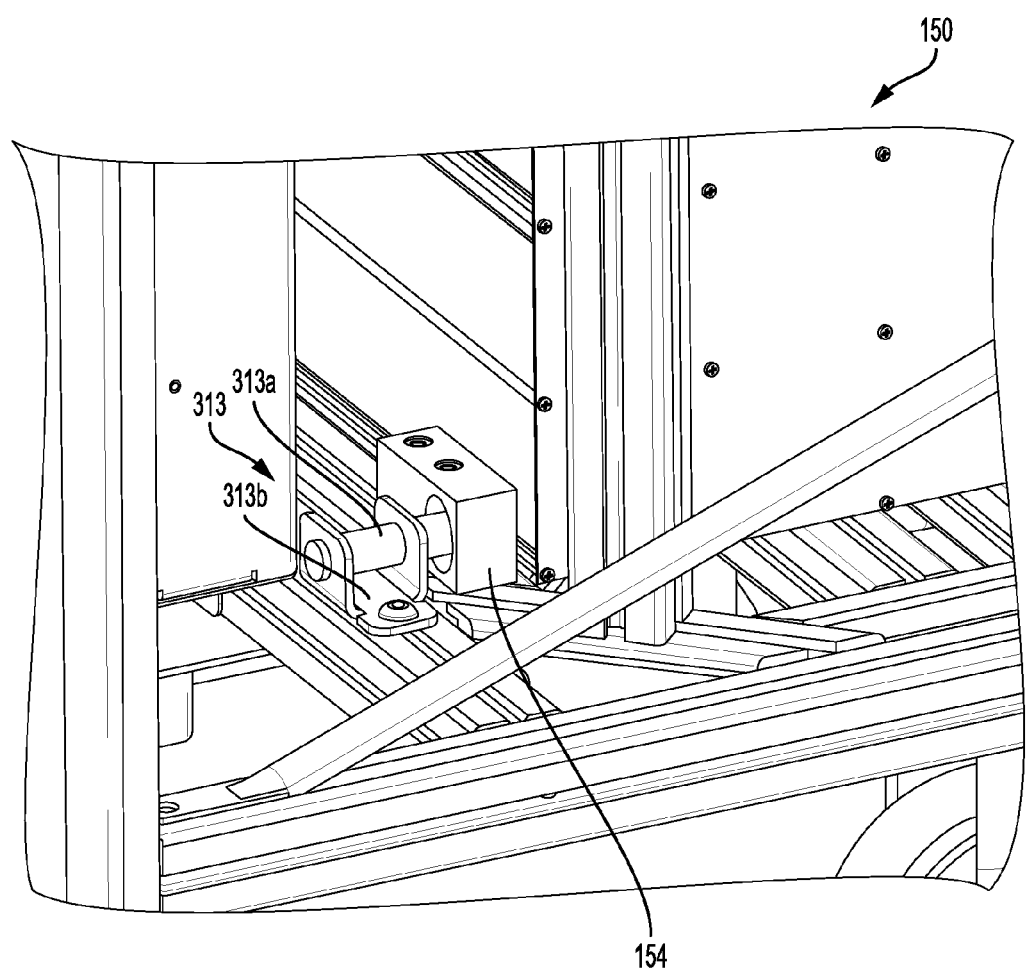
Figure 7C:
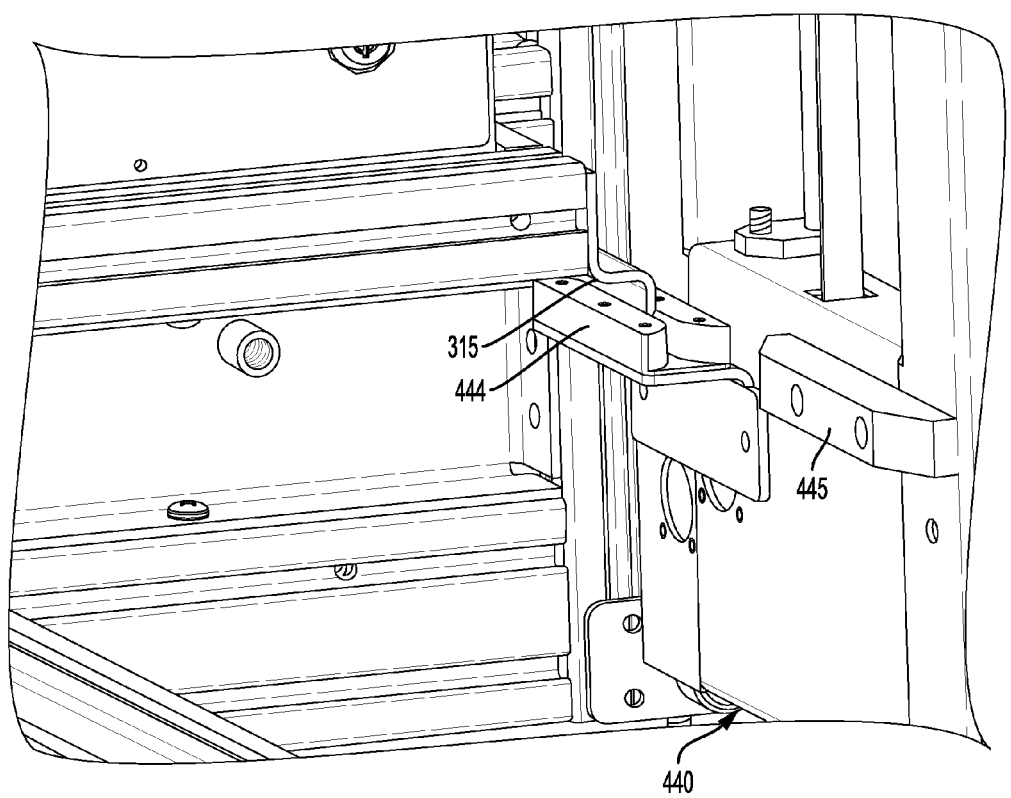
Figure 8:
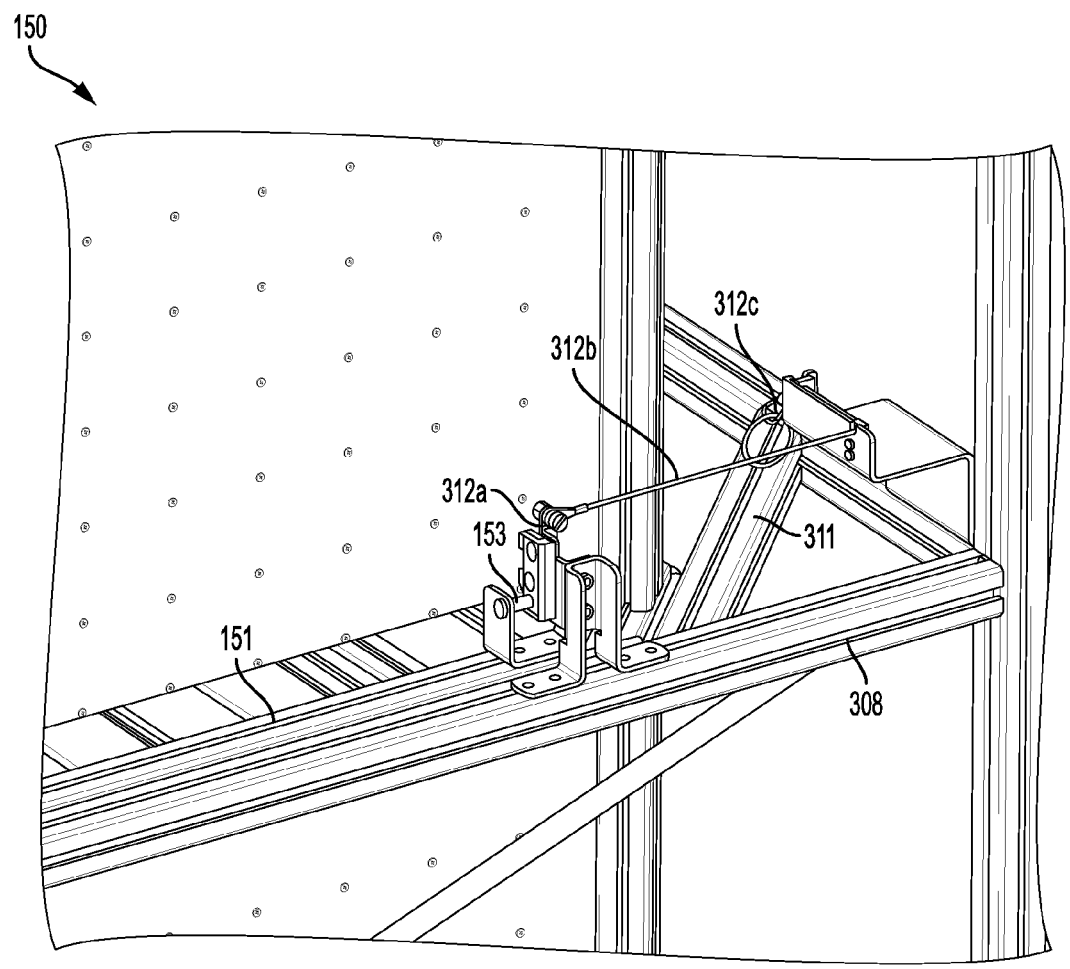
FIG. 8 shows a perspective view of a cart locking mechanism according to one embodiment of the present invention.

FIGS. 6-8 illustrate various cart engagement mechanisms for securing a cart 150 in a desired position within a dispenser 7. In the illustrated embodiment of FIG. 6, the housing 50 of the dispenser 7 comprises a horizontal guide rail 308 extending substantially around the interior perimeter of the housing 50, a guide pin 313 coupled to a first side of the interior of the housing 50 and configured to engage a pin guide block 154 secured to the cart 150, and a cart locking mechanism 312 configured to engage a locking member 153 secured to the cart 150.

As shown in FIG. 6, the horizontal guide rail 308 is configured to engage a corresponding guide strip 151a secured to the horizontal guide rail 151 of the cart 150 to facilitate movement of the cart 150 into the housing 50. As shown in FIG. 6, the horizontal guide rail 308 comprises one or more horizontal bars configured to engage a corresponding portion of the cart 150 (e.g., horizontal guide rail 151). At least one of the horizontal guide rail 308 and the corresponding portion of the cart (e.g., horizontal guide rail 151) has a low-friction slide block 151a secured thereto, which comprises a low-friction plastic material configured to facilitate sliding of the cart 150 along the length of the horizontal guide rail 308.

As shown in FIG. 7A, the horizontal guide rail 308 extends such that a portion of the horizontal guide rail is parallel with the first side panel 302 of the dispenser 7 to form a cart stop 314. In the illustrated embodiment of FIG. 7A, the cart stop 314 is configured to engage a portion of the cart 150 (e.g., a portion of the cart frame 160) and thereby prevent the cart 150 from moving laterally within the housing 50 in a direction toward the first side of the dispenser 7. Thus, upon placement of the cart 150 in a desired position within the housing 50, the cart stop 314 prevents the cart 150 from being repositioned in a direction toward the first side of the dispenser 7.

Moreover, as shown in detail in FIG. 7B, the housing 50 may also include a guide pin 313 secured to a bottom portion of a first side of the housing 50 and configured to engage a pin guide block 154 secured to the cart 150. As shown in FIG. 7B, the guide pin 313 comprises a cylinder 313a extending in a direction parallel to the back of the housing 50, and a bracket 313b secured to the cylinder 313a and configured to couple the cylinder 313a to the dispenser 50. As shown in FIG. 7B, the bracket 313b may be coupled to the dispenser using one or more fasteners (e.g., screws, bolts, and/or the like).

The corresponding pin guide block 154 comprises a solid block secured to a first side of the cart 150 within the perimeter of the cart 150, and having a hole extending at least partially through the block in a direction parallel to the back of the cart 150. The pin guide block 154 is positioned such that when the cart 150 is in the desired position, and a portion of the cart 150 is in contact with the cart stop 314, at least a portion of the cylinder 313a is positioned within the hole extending through the block 154. Thus, the guide pin 313 impedes movement of the first side of the cart in a direction substantially parallel to the first side of the housing 50. A portion of the surface of the cylinder 313a is configured to engage a corresponding portion of the interior surface of the hole upon the application of a force to the first side of the cart 150 in a direction parallel to the first side of the housing 50. Moreover, the configuration of the pin 313 and the pin guide block 154 do not prevent contact between the cart frame 160 and the cart stop 314.

Moreover, as shown in FIG. 7C, which provides a close-up perspective view of additional cart guide mechanisms located proximate the second side of the access opening 110d, the item access mechanism 440 may comprise a guide 444 configured to engage a guide rail 155 located near a front bottom edge of the cart 150. As shown in FIG. 7C, the guide 444 comprises a guide block having a slot extending therethrough in a direction parallel to the entrance opening 110. In the illustrated embodiment of FIG. 7C, the slot is configured to engage the guide rail 155, and thereby facilitate placement of the cart 150 within the housing 50, and provide additional security against unauthorized entry into the interior of the housing 50 when a cart 150 is located therein. As shown in FIG. 7C, the guide 444 additionally comprises a bracket configured to support the guide block and to couple the guide 444 to the item access mechanism 440. Moreover, as shown in FIG. 7C, the item access mechanism 440 comprises an anti-twist block 445 secured to an interior surface of the item access mechanism 440 and configured to engage a portion of the cart 150 upon the application of a force to a bottom portion of the item access mechanism 440. For example, upon an unauthorized user pushing against the bottom portion of the item access mechanism 440 while a cart 150 is located in the housing 50, the anti-twist block 445 engages a bottom portion of the cart 150 while the guide 444 engages a portion of the guide bar 155, and thereby prevent the item access mechanism 440 from being moved toward an interior of the housing 50. When the cart 150 is not located within the housing 50, or when the item access mechanism 440 is proximate a second side of the access opening 110d, the guide is configured to engage a locator bracket 315 secured to the housing 50. Thus, the locator bracket 315 prevents the item access mechanism 440 from being dislocated toward an interior of the housing 50 when no cart 150 is located within the housing 50.

As shown in the illustrated embodiment of FIGS. 4 and 6, the cart 150 comprises a locking member 153 configured to engage a locking mechanism 312 secured to the dispenser. Generally, the locking mechanism 312 serves to selectively secure the cart 150 in its desired position within the housing 50. In the illustrated embodiment, the cart locking mechanism 312 includes a latch 312a, which is pivotably connected to the housing 50, and a wire 312b, which operatively connects the latch to a user engagement mechanism 312c configured to release the latch 312a upon the application of a force applied by a user. The latch 312a extends into the interior of the housing 50 so as to engage the locking member 153 positioned within the perimeter of the cart 150.

As can be appreciated from FIG. 8, which shows a close-up view of the locking mechanism 312, the latch 312a is configured to engage the locking member 153 supported by a bracket secured to a back portion of the cart 150 (e.g., supported by the horizontal guide rail 151 and within the perimeter of the cart 150). Specifically, the cart locking mechanism 312 is configured such that, when the cart 150 is moved to its desired position, the cart locking mechanism's latch 312a engages the locking member 153 and prevents the cart 150 from being moved out of its desired position. As will be described in greater detail herein, as the cart 150 is moved into the desired position, the cart 150 slides along the angled guide rail 311 of the guide bar 308, and therefore the movement of the locking member 153 has a movement vector parallel to the side wall of the housing 50, such that the latch 312a of the cart locking mechanism may engage the locking member 153 of the cart 150.

Moreover, as will be discussed in detail in reference to FIGS. 9-13, the housing 50 may additionally include a front placement guide 316 and a rear placement guide 317 configured to facilitate movement of the cart 150 into and out of the housing 50 by engaging the front guide roller 156 and the rear guide roller 157. The front placement guide 316 has a curved, generally concave guide surface 316a configured to direct the cart 150 from a first direction in which the cart is angled into the dispenser 7 to a second direction in which the cart is angled such that the first side 44 of the cart 150 is directed toward the cart stop 314 and the second side of the cart is directed toward the rear of the dispenser 7. As shown in the illustrated embodiment of FIG. 7D, which illustrates a top view of the first side of the dispenser with the top panel 304 removed, the front placement guide 316 additionally comprises a guide slot 156b configured to accept the front guide roller 156 of the cart 150 when the cart is in a fully-inserted position within the housing 50. When the front guide roller 156 is positioned within the guide slot 156b, the guide slot 156b prevents an upper portion of the cart 150 from tipping forward toward the access opening 110. Thus, in the event the cart 150 begins to tip forward while in the fully inserted position within the housing 50, the front guide roller 156 engages an interior surface of the guide slot 156b and is thereby prevented from moving toward the access opening 110.

Similarly, the rear placement guide 317 comprises an angled guide surface 317a configured to facilitate movement of the cart out of the dispenser 7 by engaging the rear guide roller 157. Thus, when engaged with the rear guide roller 157, the rear placement guide 317 directs the cart 150 away from the cart stop 314 and through the access opening 110. In various embodiments, the front placement guide 316 and rear placement guide 317 are secured to an upper portion of the housing 50 such that the front and rear guide rollers 156, which extend vertically away from a ceiling of the cart 150 are configured to engage the front and rear placement guides 316, 317 during insertion and removal of the cart 150.

Figure 8A:
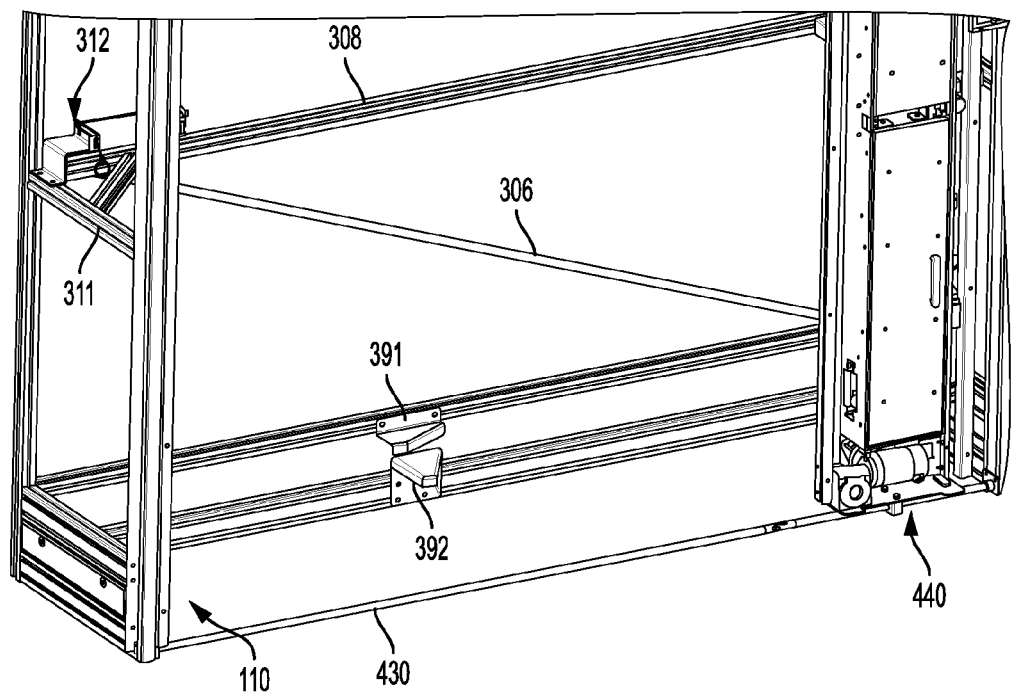
FIG. 8A shows a perspective view of engagement members configured for engaging a cart's retractable support base according to one embodiment of the present invention.

In various embodiments, the housing 50 may additionally comprise one or more features for operating the retractable support base 1000 of a cart 150. As shown in FIG. 8A, the housing 50 comprises a latch release member 391 secured to a back portion of the housing 50 and configured to engage the release device 1055 of the retractable support base 1000 and thereby release the support pin 1022 and permit the outrigger member 1010 to rotate away from the extended configuration and toward the retracted configuration. As shown in FIG. 8A, the latch release member 391 comprises an angled release surface configured to apply a force to maintain the latch 1050 in the open configuration as the cart 150 is guided into the housing 50.

Moreover, as shown in FIG. 8A, the housing 50 additionally comprises a pivot actuating member 392 secured to a back portion of the housing 50 and configured to engage the outrigger member 1010 and thereby pivot the outrigger member toward the retracted configuration as the cart 150 is guided into the housing 50.

Figure 8B:
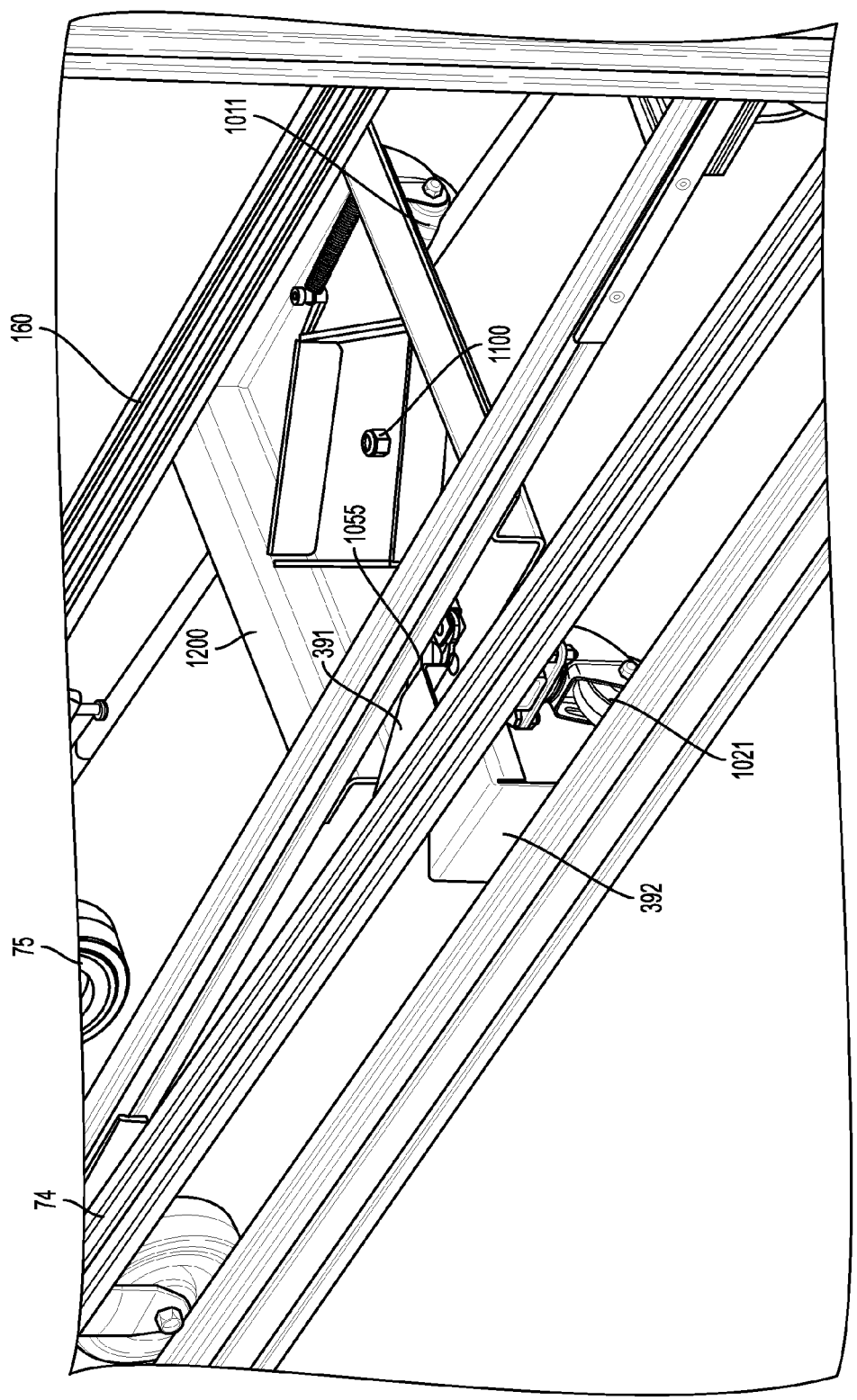
FIGS. 8B-8D show perspective views of a cart's retractable support base engaged with engagement members according to one embodiment of the present invention.
Figure 8C:
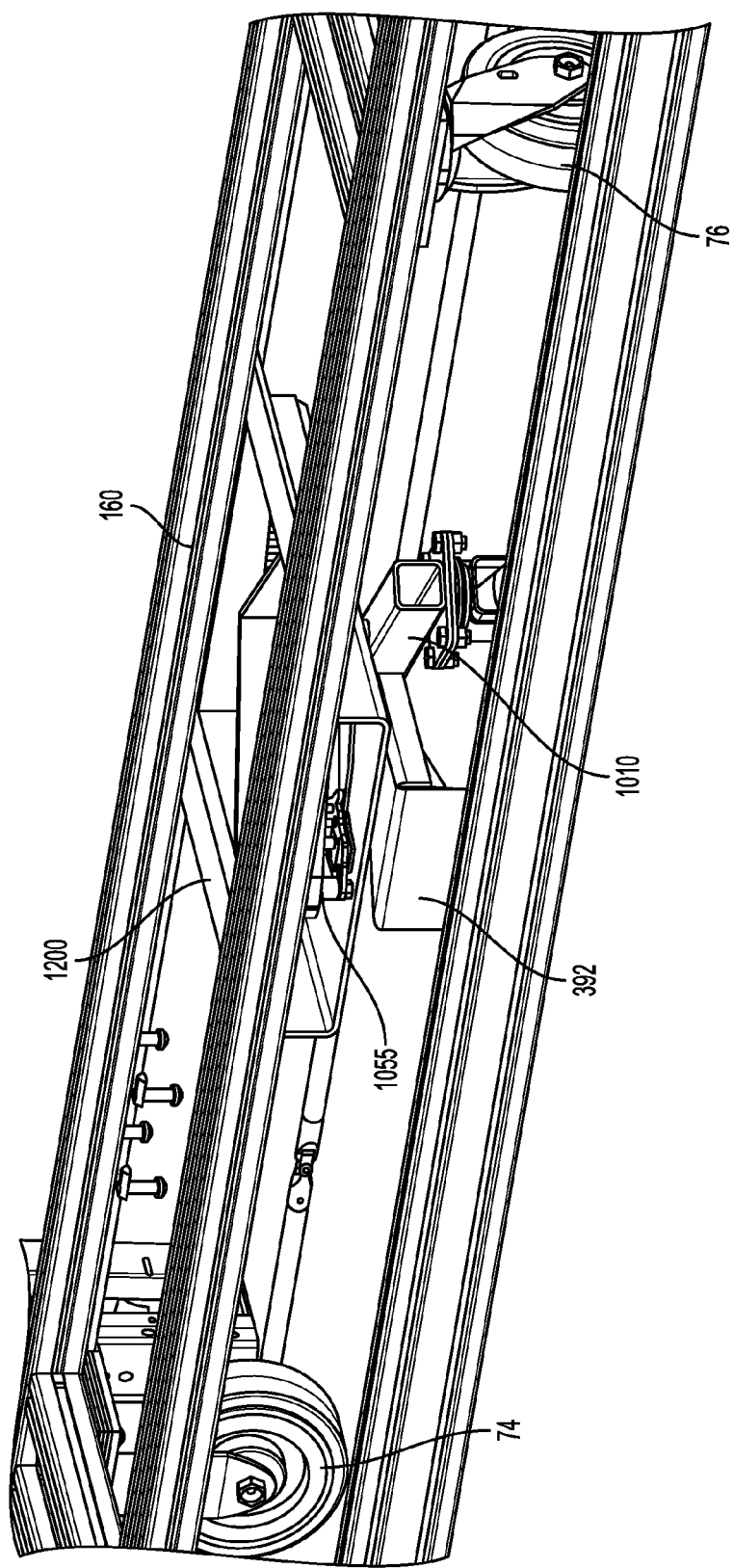
Figure 8D:
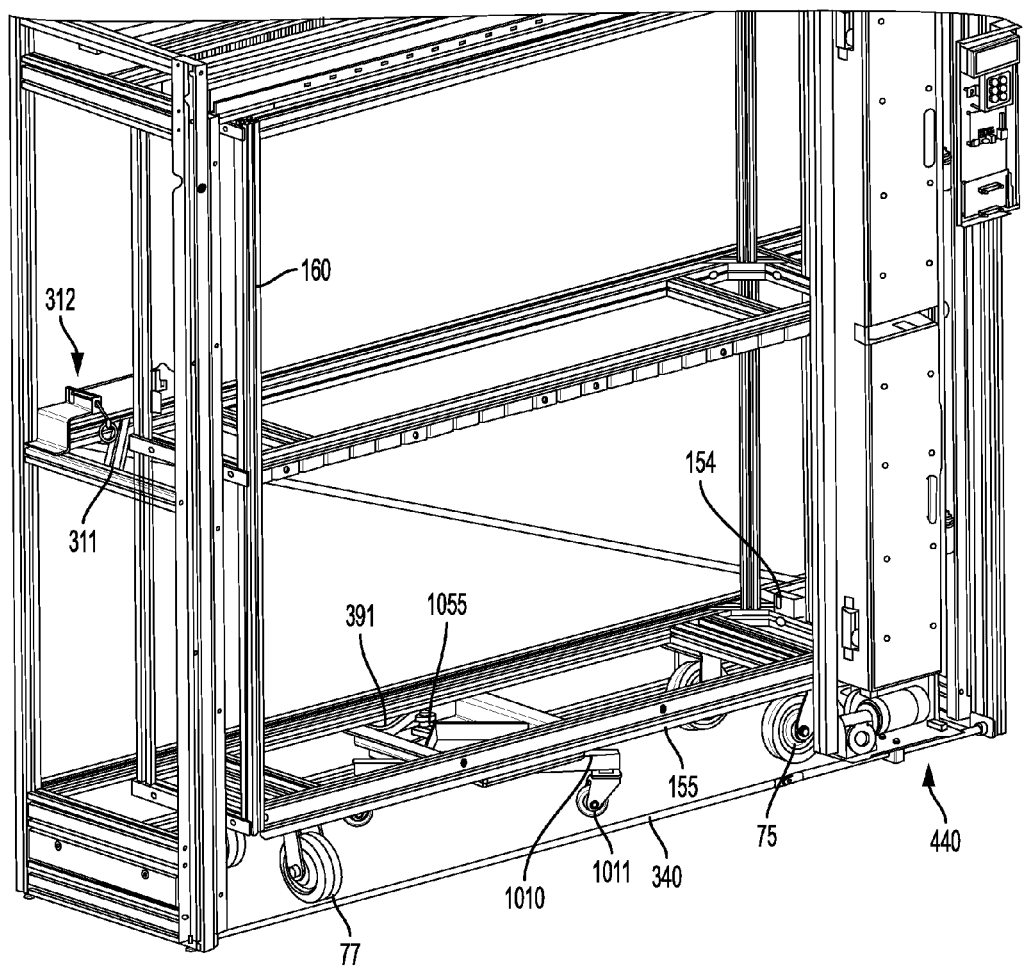

As shown in FIG. 8B, while the cart 150 is being inserted into the housing 50, and after the latch release member 391 engages the release device 1055 and thereby releases the latch 1050 such that the outrigger member 1010 is permitted to rotate toward the retracted configuration, the pivot actuating member 392 engages the rear portion of the outrigger member 1010 to pivot the outrigger member 1010 toward the retracted configuration. Referring now to FIG. 8C, which illustrates a rear view of the housing 50 while a cart 150 is being inserted therein, the pivot actuating member 392 is configured to remain in contact with the rear portion of the outrigger member 1010 while the cart 150 is positioned within the housing 50. Accordingly, the pivot actuating member 392 prevents the outrigger member 1010 from rotating away from the retracted configuration while the cart 150 is positioned within the housing 50, as shown in FIG. 8D, which illustrates a cart 150 positioned in the fully inserted position within the housing 50 with the retractable support base 1000 in the retracted configuration.

When removing the cart 150 from the housing 50, the biasing system of the retractable support base 1000 causes the outrigger member 1010 to move toward the extended configuration, thereby forming a larger, more stable base for the cart 150 when removed from the housing 50. As the outrigger member 1010 rotates to the extended configuration under the force applied by the biasing system (e.g., biasing spring 1110), the rear stability pin 1022 engages the latch mechanism 1050 to thereby selectively latch the outrigger member 1010 in the extended configuration.

Accordingly, the movement between the extended configuration and the retracted configuration occurs while the cart 150 is being positioned within the housing 50, but does not require any specific user interaction to cause the retractable support base 1000 to rotate. Similarly, the retractable support base 1000 rotates from the retracted configuration to the extended configuration upon removal of the cart 150 from the housing 50 without any specific user interaction.

Exemplary Placement of a Cart within a Dispenser

FIGS. 9-13 illustrate an example of the general operation of the dispenser's guide apparatus and a method for inserting a moveable storage cart 150 into the dispenser 7. In particular, the illustrated example shows steps for inserting a movable cart 150 into the housing of the dispenser. The cart 150 includes two substantially fixed (e.g., non-swiveling) front wheels 74-75, two swiveling rear wheels 76-77, and may, in certain embodiments, additionally comprise a front guide roller 156, and a rear guide roller 157. However, it should be understood that similar techniques may be used in conjunction with carts having other combinations and types of wheels (e.g., two front swiveling wheels and two rear swiveling wheels).

Figure 9:
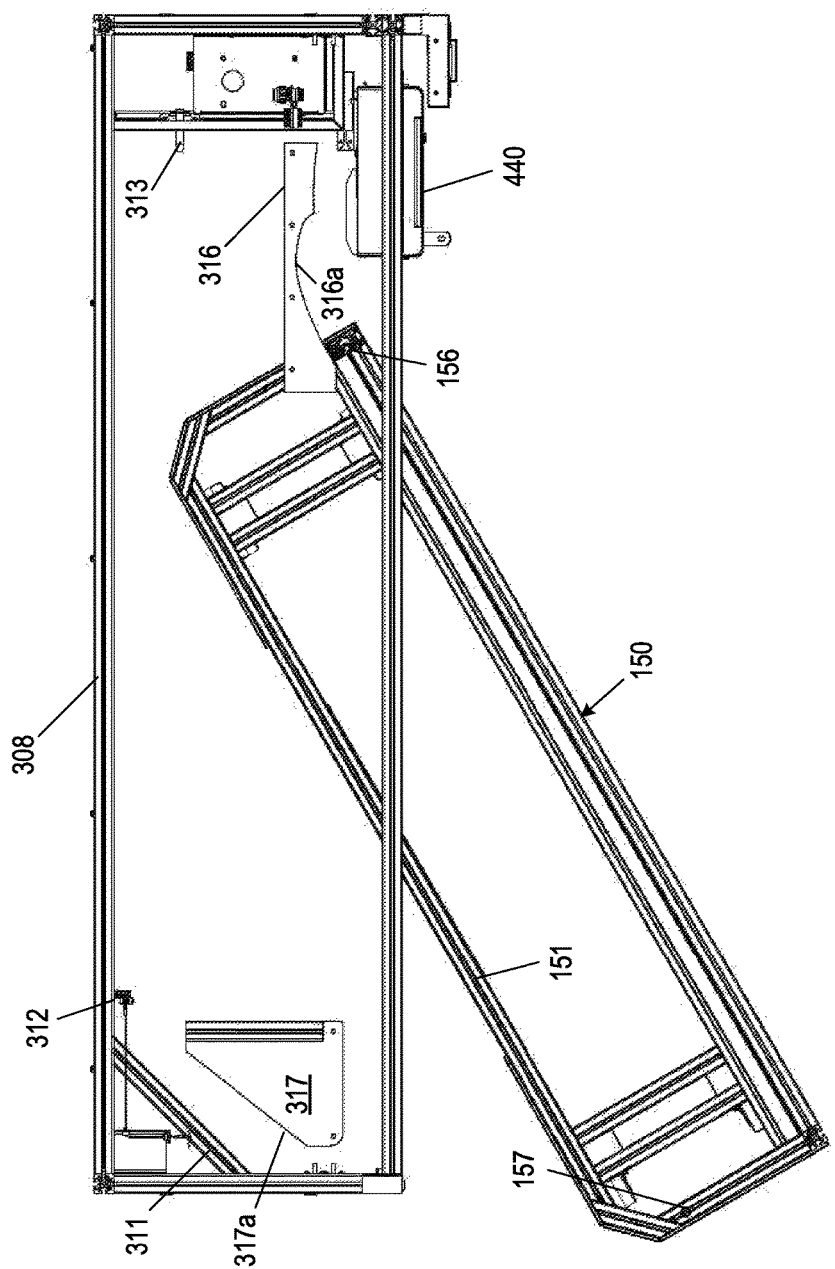
FIGS. 9-12 show schematic diagrams of a cart being directed into a dispenser according to one embodiment of the present invention.

Beginning with the illustration of FIG. 9, the dispenser 7 is first configured by a user such that the access door 60 is moved to its open position and the security bar 230 is moved to its access position. The user next positions the cart 150 as shown in FIG. 9 so that the cart's fixed, front wheels 74, 75 are substantially aligned such that the cart 150 will move into the interior of the dispenser 7 at an angle relative to the access opening 110, and the front guide roller 156 will engage the front placement guide 316. As shown in FIG. 9, when aligned prior to insertion of the cart 150 into the dispenser 7, the cart 150 is oriented such that the longitudinal axis of the cart 150 is at an angle between about 10 and 80 degrees with respect to a plane defined by the housing's access opening 110. When oriented prior to insertion into the dispenser 7, the cart 150 is positioned such that at least part of the storage cart 150 is located within the interior area of the housing 50. In various embodiments, the cart 150 may be positioned within the interior of the housing 50 without the placement guides 316, 317 and corresponding guide rollers 156, 157.

As shown in FIG. 9, the user next pushes the cart 150 such that its front guide roller 156 engages the front wall of the front placement guide 316a. As shown in FIG. 9, the front wall of the front placement guide 316a is curved so as to facilitate placement of the cart 150 into the interior of the housing 50. The cart 150 is moved until the second rear corner of the cart, defined as the location where the rear side and the second lateral side of the body meet is positioned such that the second lateral side of the access opening is not aligned with a portion of the cart in a direction parallel to the second side of the dispenser. In transitioning from the position shown in FIG. 9 to the position shown in FIG. 10, the front guide roller 156 follows the curvature of the front wall of the front placement guide 316a, and thereby the cart is guided into the interior of the housing 50 as a user pushes the cart into housing 50. In various embodiments, the cart 150 may be moved into the interior of the housing 50 such that a portion of the horizontal guide bar 151 of the cart 150 contacts the horizontal guide bar 308, and slides along the surface of the horizontal guide bar 308 as the cart 150 is being maneuvered into the interior of the housing 50.

Figure 10:
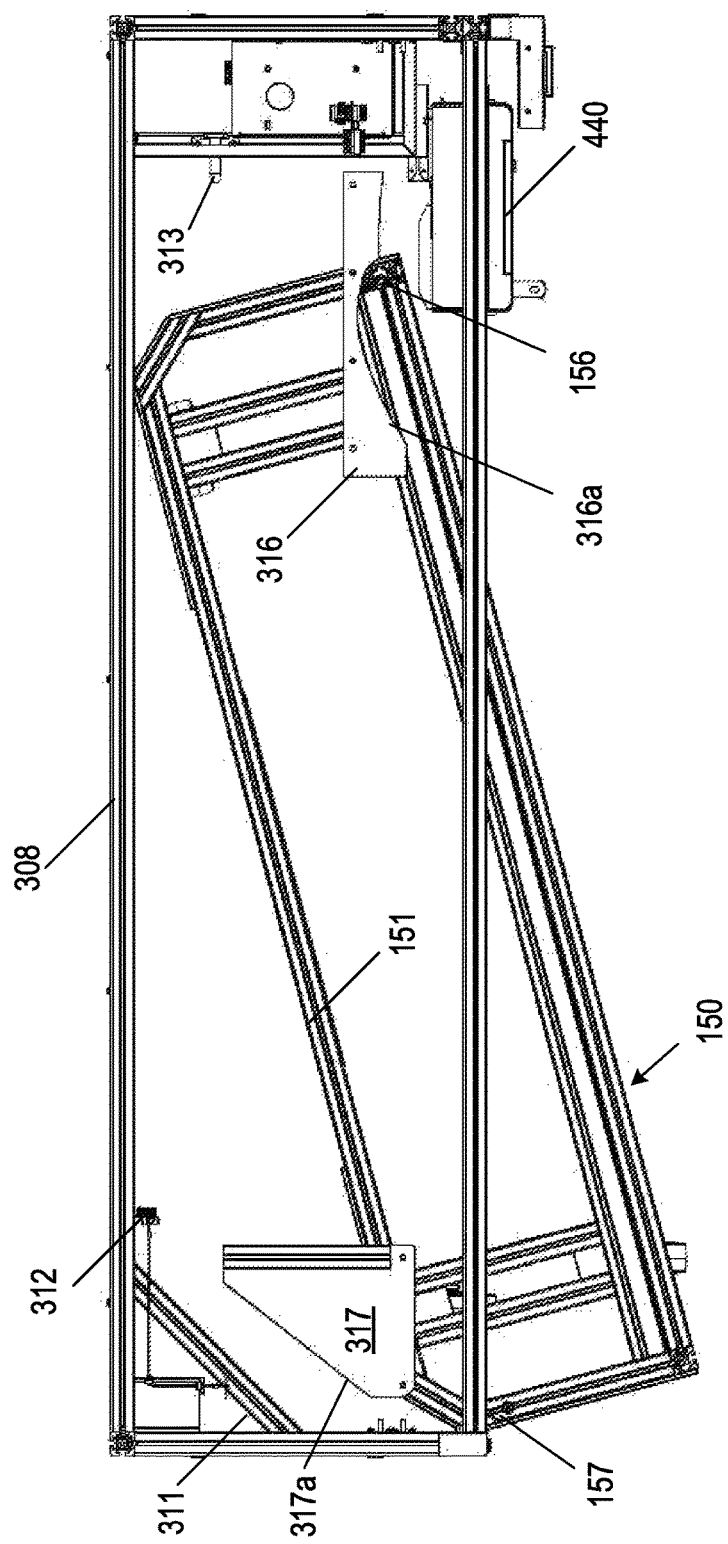
Figure 11:
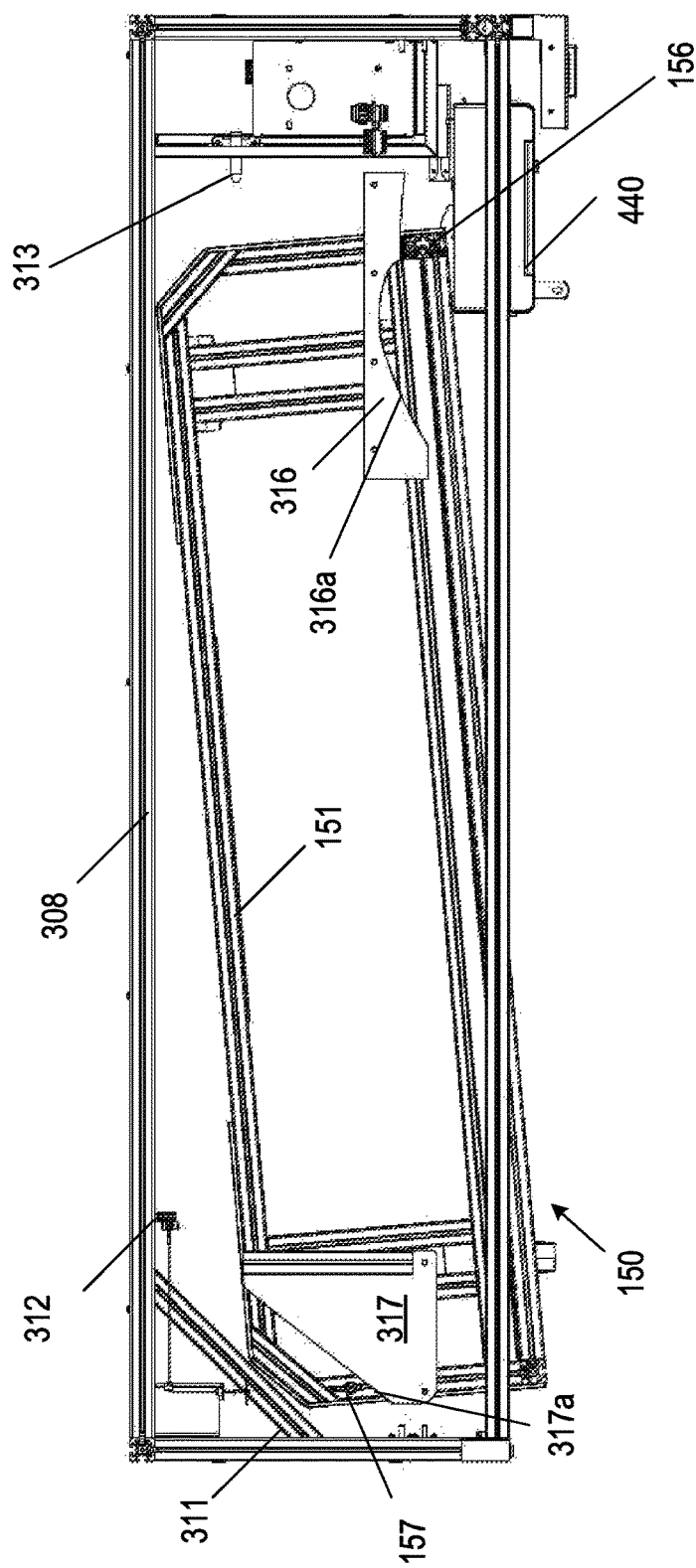

Next, the user pushes the rear portion of the cart 150 toward the rear of the dispenser 7. As shown in FIG. 10, this causes the cart's swiveling, rear wheels 76, 77 to rotate from (1) a first orientation in which the cart's rear wheels 76, 77 are substantially parallel to the cart's front wheels 74, 75 (e.g., as shown in FIG. 9) to (2) a second orientation in which the cart's rear wheels 76, 77 are oriented to travel toward the rear of the dispenser (e.g., as shown in FIG. 10).

Figure 12:
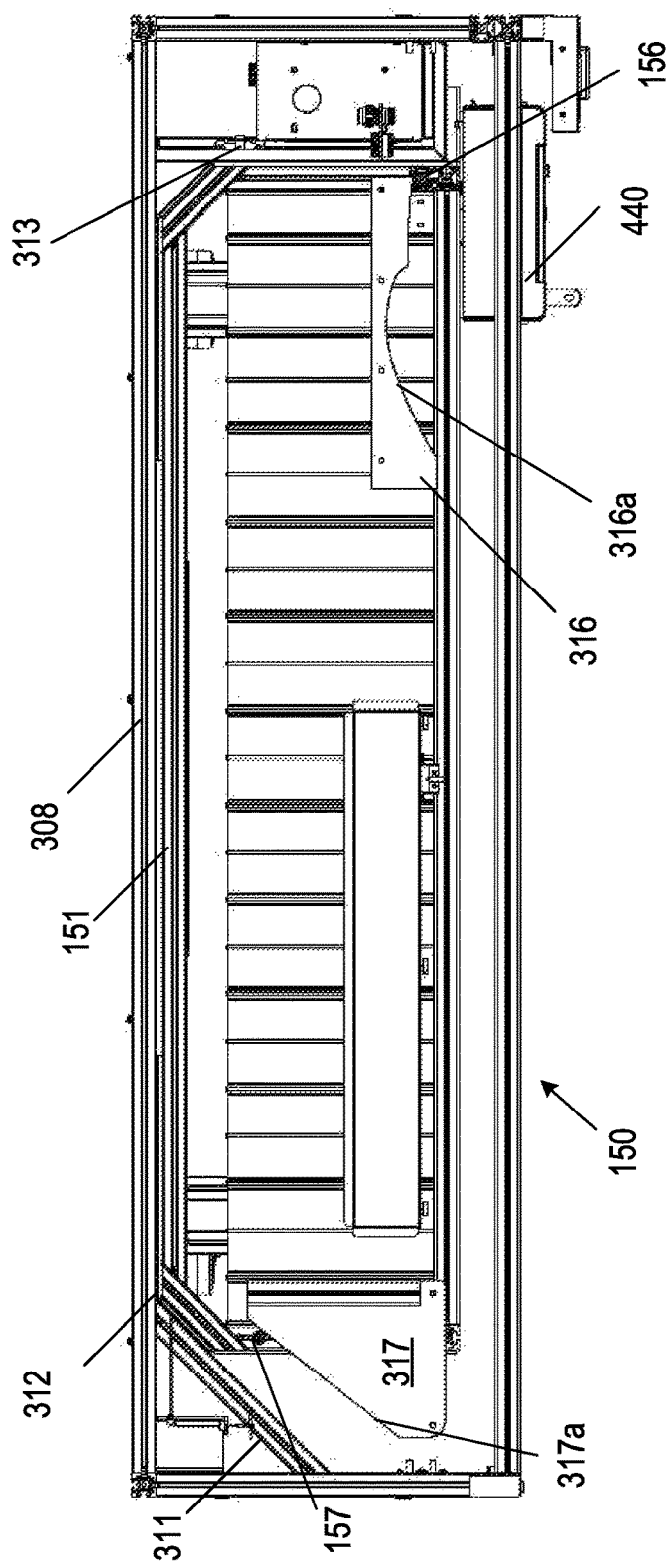
Figure 13:
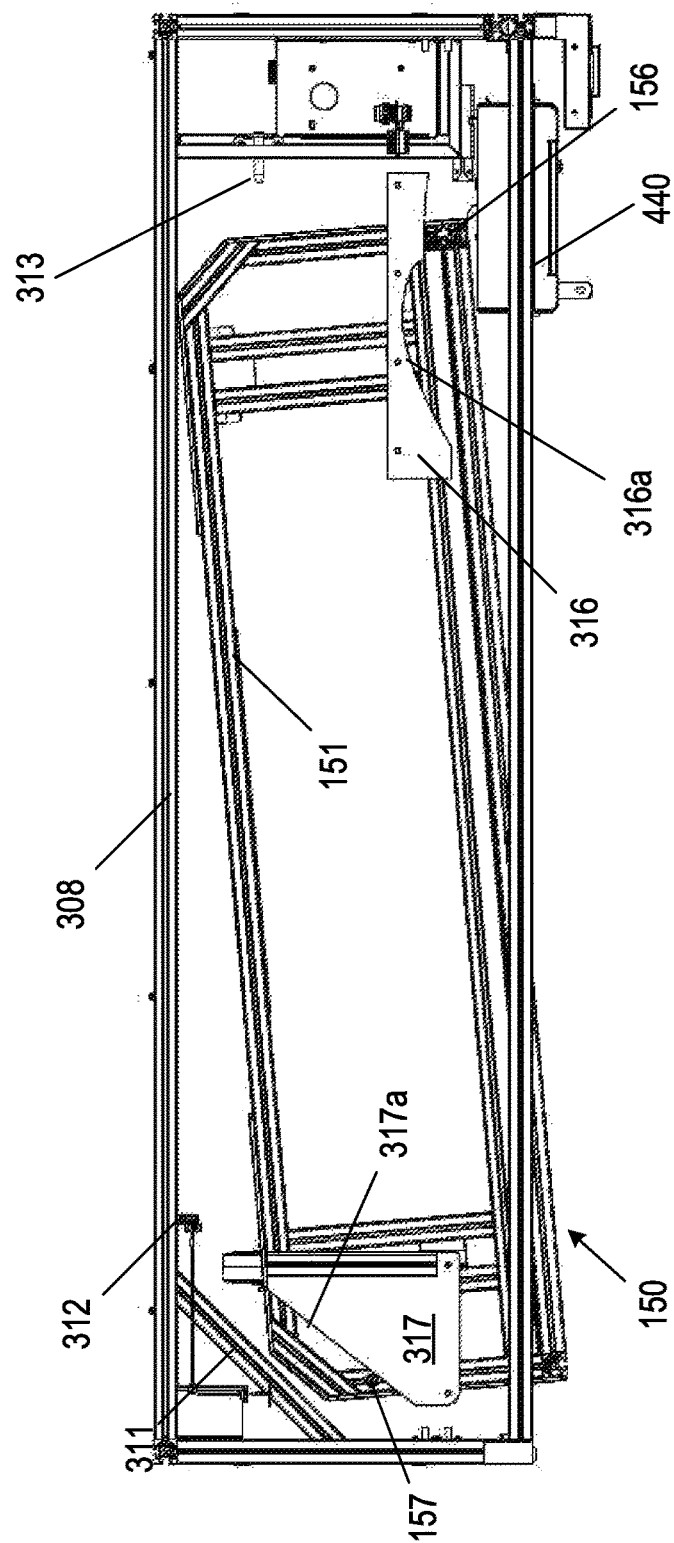
FIG. 13 shows a schematic diagram of a cart being directed out of a dispenser according to one embodiment of the present invention.

Next, the user pushes the rear portion of the cart 150 such that cart 150 rotates into the dispenser's housing 50 and is guided by the cart guide rail 308 such that the cart 150 generally slides along the angled guide rail 311 until the cart 150 is entirely within the dispenser 7. In particular, as the user pushes the rear portion of the cart 150, the second rear corner of the cart contacts the angled guide rail 311 (as shown in FIG. 12) and continues to slide until a portion of rear of the cart adjacent the second rear corner is in contact with the guide bar 308. Thus, as the second rear corner slides along the angled guide rail 311, the cart 150 moves both laterally relative to the dispenser 7 (e.g., in a direction parallel to the rear of the dispenser) and into the dispenser 7 (e.g., in a direction parallel to the side walls of the dispenser), such that the cart 150 is moved toward the cart stop 314 and the guide pin 313.

In the resulting loaded position shown in FIG. 12, the cart 150 is fully inserted within the interior area of the dispenser's housing 50. In the loaded position, the first side of the cart is located substantially adjacent and parallel to the cart stop 314, the rear side of the cart is located substantially adjacent and parallel to the rear portion of the guide member 308, and the chamfered locator angle 152 of the cart 150 is located substantially adjacent and parallel to the angled guide rail 311 of the cart guide member 308. As a result, the access door 60 can be moved to its closed position and the security bar 230 moved to its retention position in order to resume normal use of the dispenser 7. Additionally, in the loaded position shown in FIG. 12, the cart locking member 153 is engaged with the cart locking mechanism 312 such that the cart is prevented from moving within the interior of the dispenser 7 and can thereby be repeatedly moved to a desired position in the dispenser 7 for interoperability with the item access mechanism 440. Moreover, the guide pin 313 is engaged with the pin guide block 154 to further prevent movement of the cart 150 within the interior of the dispenser 7. Referring again to FIG. 7D, in embodiments in which the front placement guide 316 comprises a guide slot 316b, the front guide roller 156 is positioned within the guide slot 316b when the cart is in the fully inserted position within the interior of the dispenser 7.

To remove the cart 150 from the dispenser 7, the user follows an analogous procedure. For example, the user first disengages the cart locking mechanism 312 by proving a force to the user engagement mechanism 312c. The user then guides the second side of the cart 150 out of the dispenser 7 (e.g., as effectively shown in FIG. 13). In so guiding the second side of the cart 150 out of the dispenser, the rear guide roller 157 contacts the rear placement guide 317. The user continues guiding the second side of the cart 150 out of the dispenser 7, which causes the rear guide roller 157 to move across the guide surface 317a of the rear placement guide 317, thereby directing the cart both toward the access opening 110 and away from the cart stop 314. The user continues guiding the cart 150 out of the dispenser 7 until a portion of the second side of the cart 150 is located outside of the interior area of the housing 50, and on the exterior side of the access opening 110. The user then guides the first side of the cart 150 out of the dispenser 7 until the cart 150 is entirely located outside of the dispenser 7. In various embodiments, the second side of the cart 150 may be guided out of the access opening 110 without a guide roller 157 contacting a guide plate 317.

As will be appreciated from the above description, the aforementioned procedure for inserting the cart 150 into the dispenser 7 enables a user to position the cart 150 by engaging portions of the cart guide mechanism. Using this method, the cart 150 can be guided into the appropriate position within the dispenser 7 and locked therein with minimal force supplied by the user.

FIGS. 14-22 provide detailed illustrations of the operation of the retractable support base 1000 as the cart 150 is being inserted into the housing 50. In various embodiments, the steps illustrated in FIGS. 14-22 may occur between the steps illustrated in FIGS. 10-12 and described in detail above.

Figure 14:
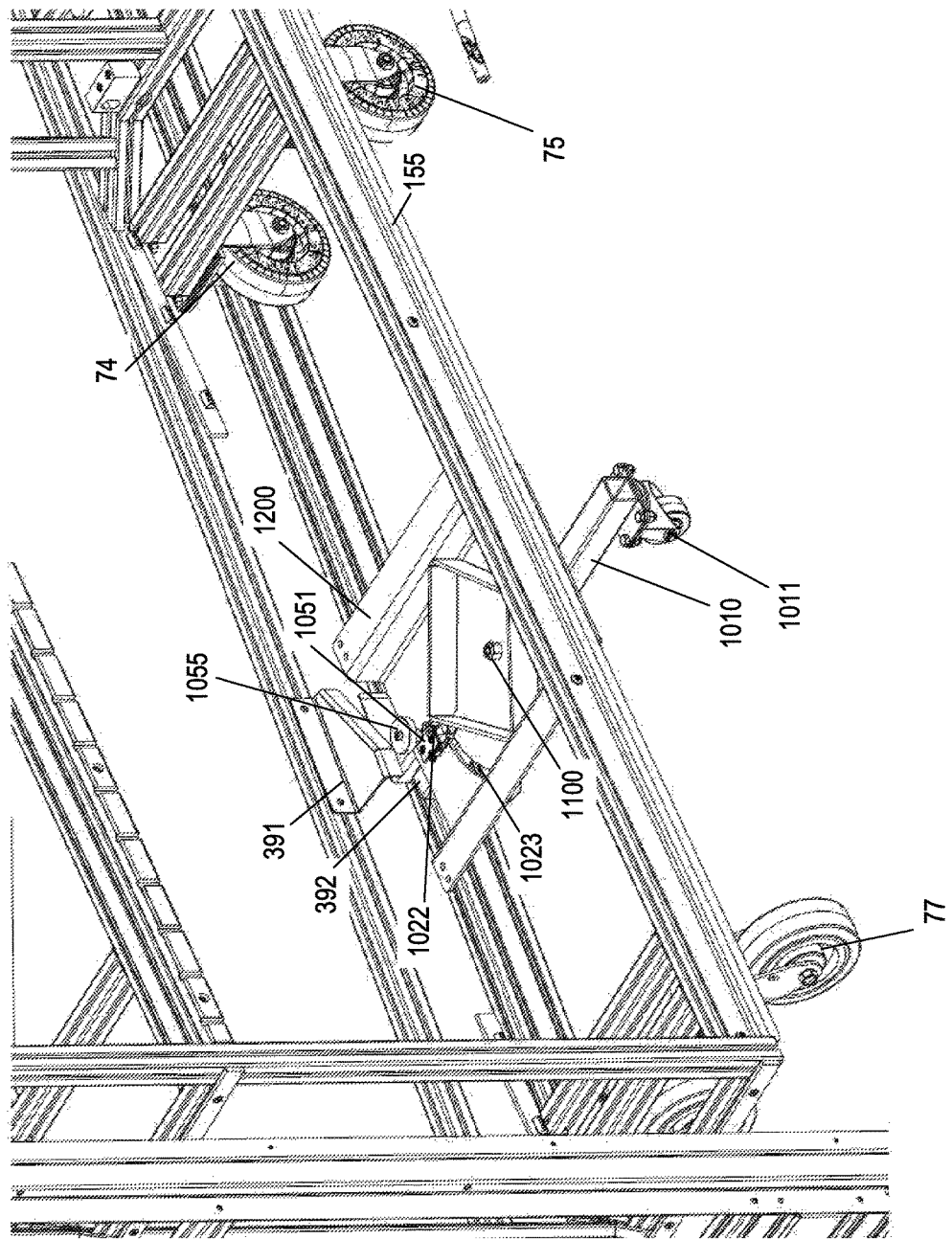
Figure 15:
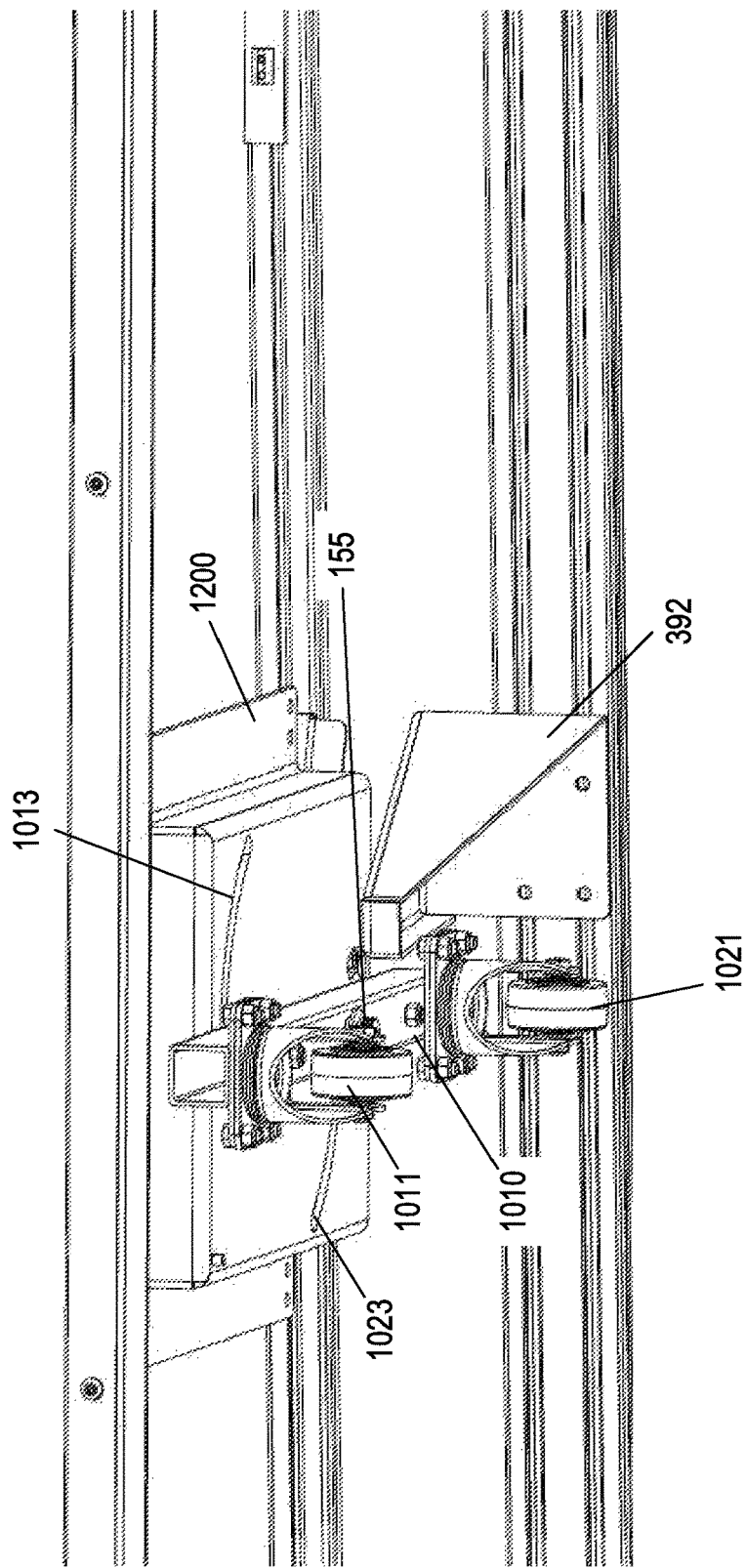

Beginning with FIG. 14, which occurs as a cart 150 having the retractable support base 1000 in the extended configuration has been guided at least partially into the housing 50 and the cart's swiveling rear wheels 76, 77 are directed toward the back of the housing 50, the cart 150 is guided into the housing 50 such that the release device 1055 is guided toward the latch release member 391. Simultaneously, the rear portion of the outrigger member 1010 is directed toward the pivot actuating member 392 as shown in FIG. 15.

Figure 16:
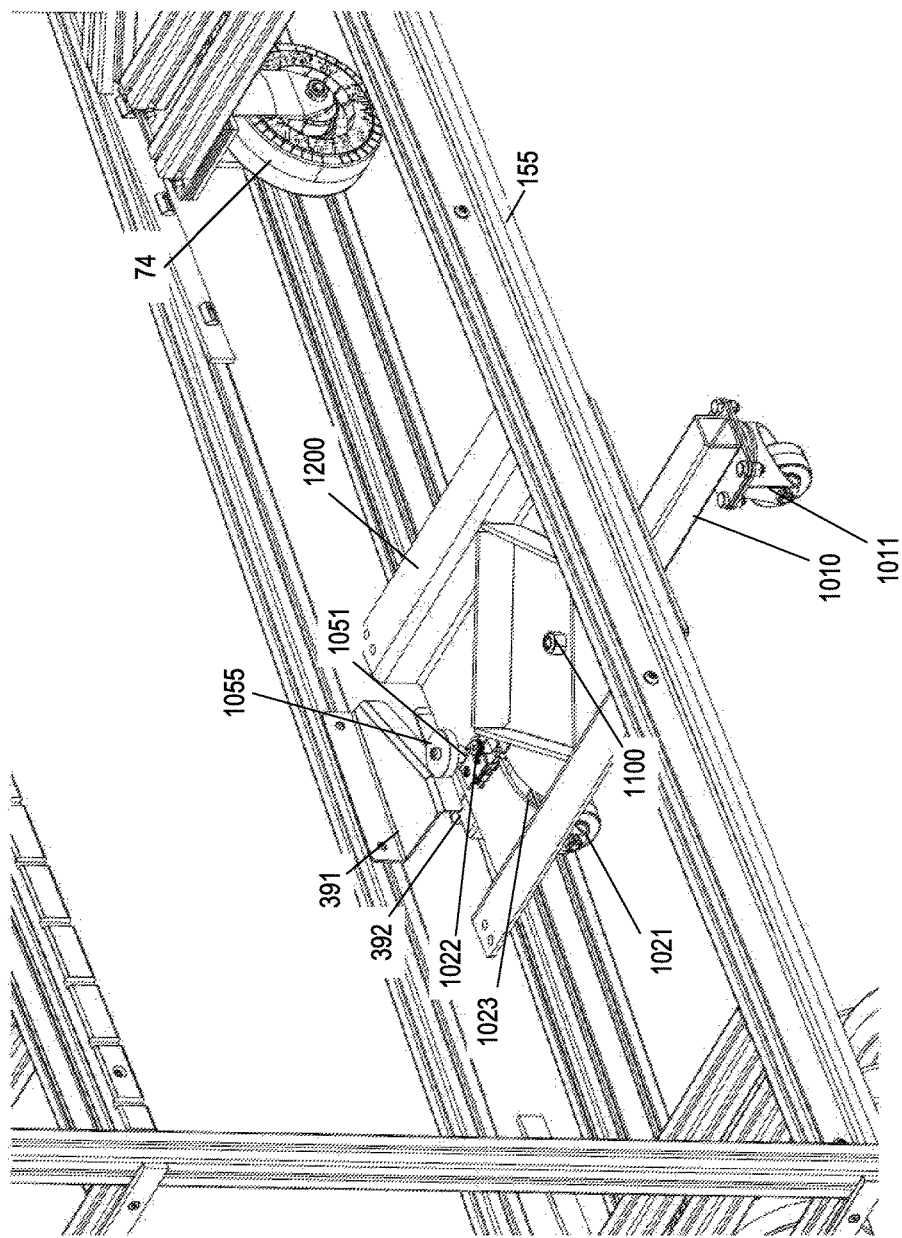
Figure 17:
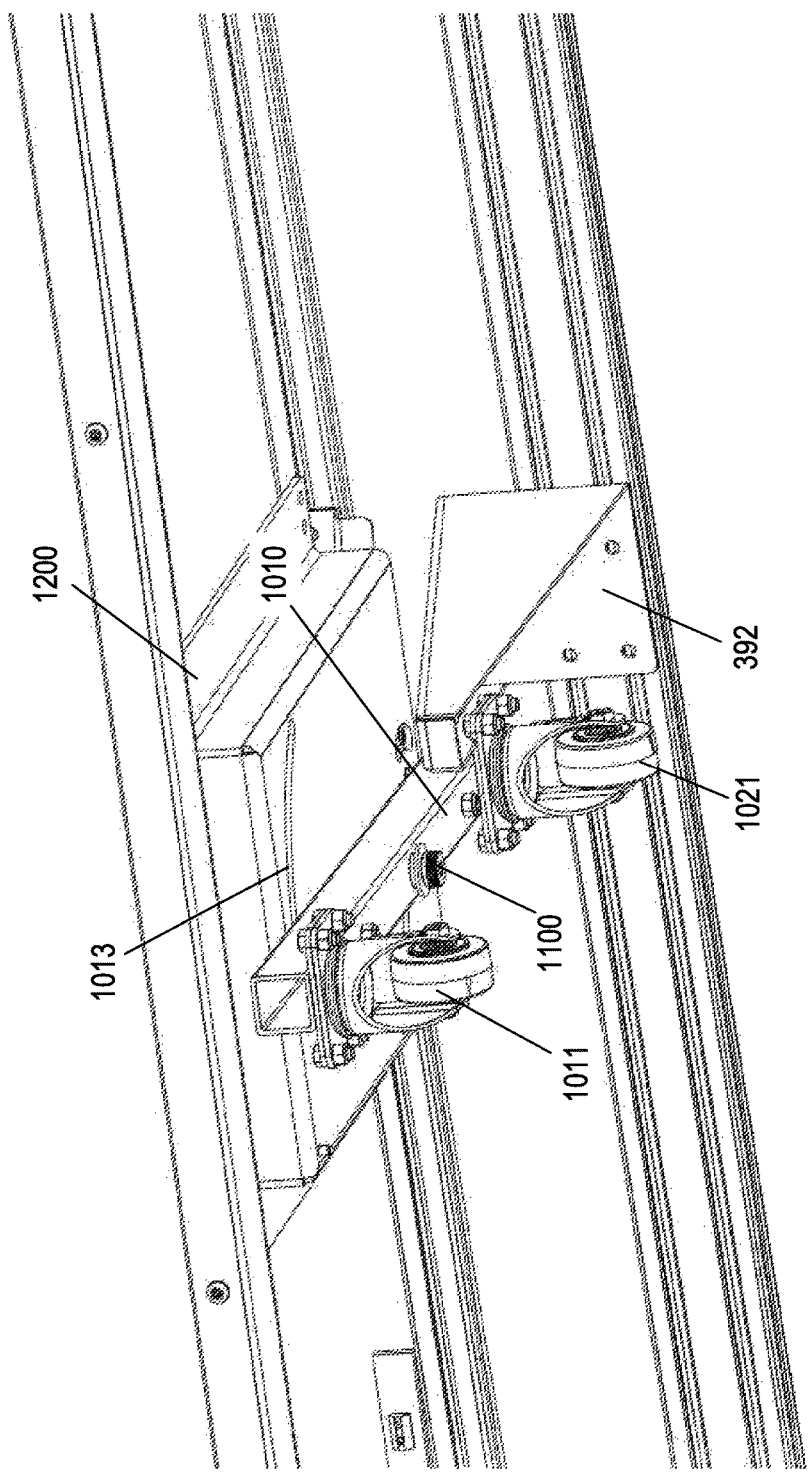

As shown in FIG. 16, the cart 150 is guided further into the housing 50 and the release device 1055 engages the latch release member 391, thereby releasing the latch 1050 from engagement with the stability pin 1022. After the latch 1050 is released and the outrigger member 1010 is permitted to rotate away from the extended position, the rear portion of the outrigger member 1010 engages the pivot actuating member 392 as shown in FIG. 17, and the outrigger member 1010 rotates away from the extended configuration as the cart 150 is guided further into the housing 50.

Figure 18:
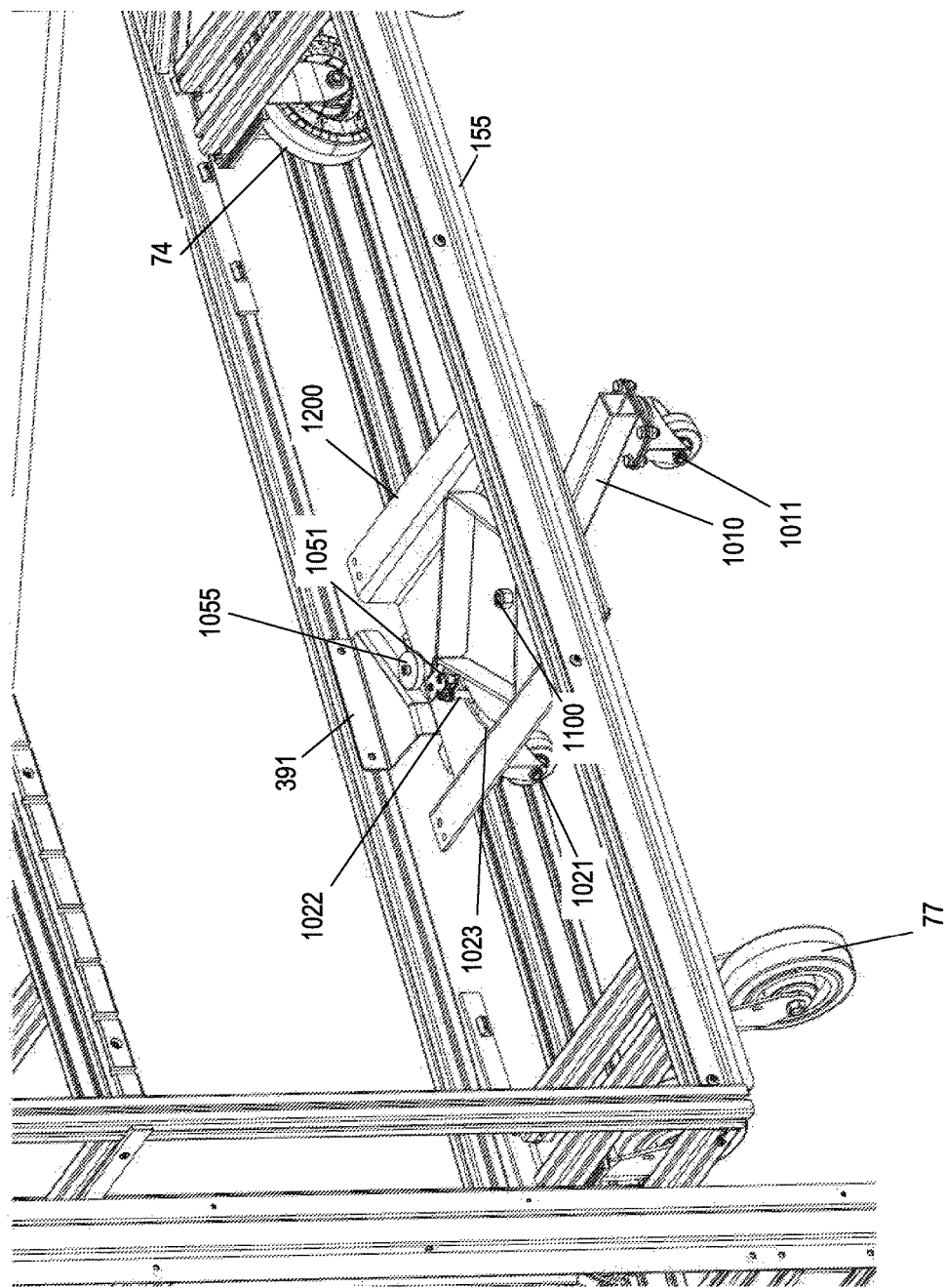
Figure 19:
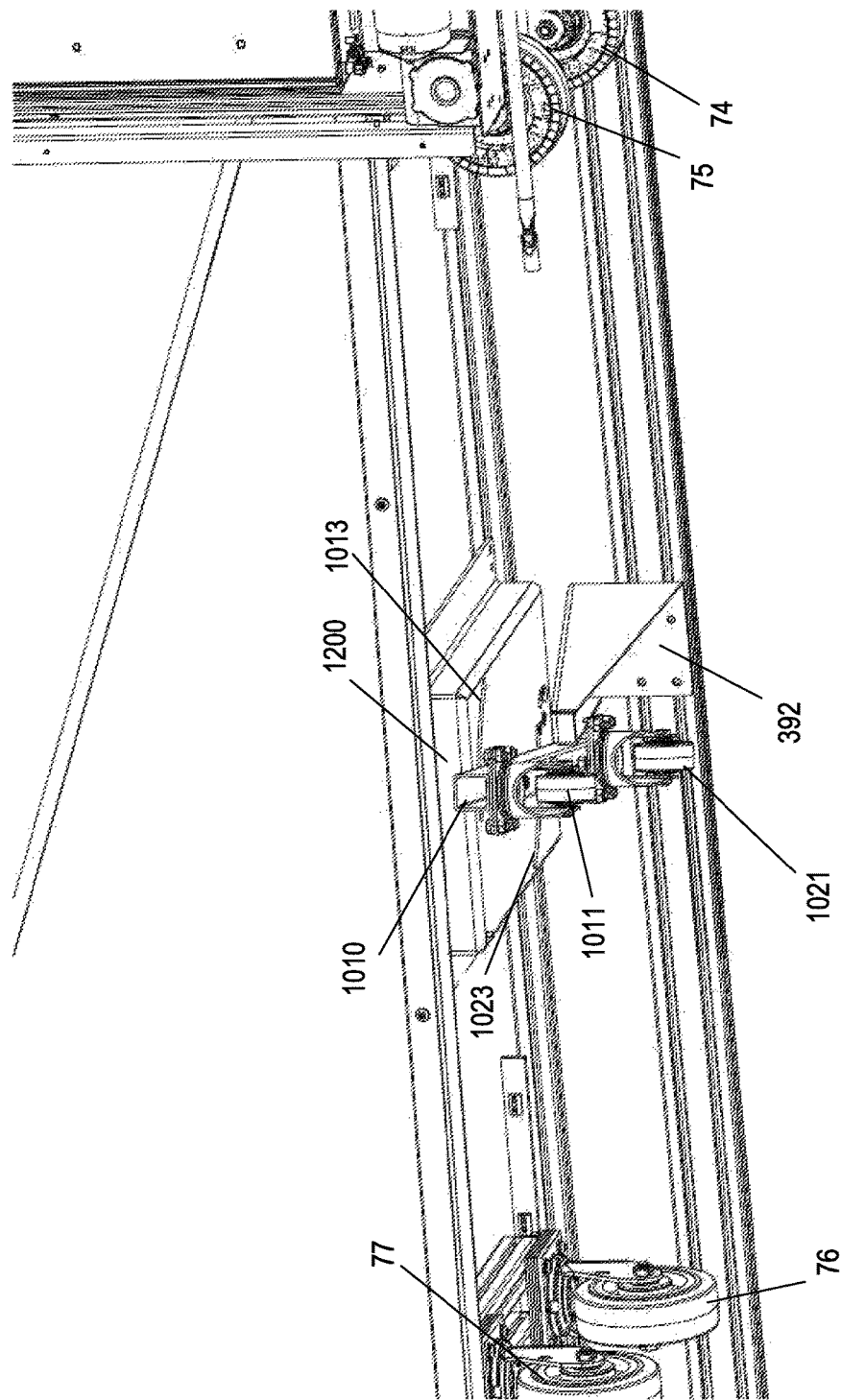

As shown in FIG. 18, the release device 1055 is configured to move along the angled release surface of the latch release member 391 as the cart 150 is guided further into the housing 50. In various embodiments, the release device 1055 may comprise a rotating member configured to roll along the angled release surface of the latch release member 391 as the cart 150 is guided into the housing 50. Simultaneously, the rear portion of the outrigger member 1010 remains in engagement with the pivot actuating member 392 as shown in FIG. 19 while the cart 150 is being guided into the housing 50, thereby causing the outrigger member 1010 to rotate toward the retracted configuration.

Figure 20:
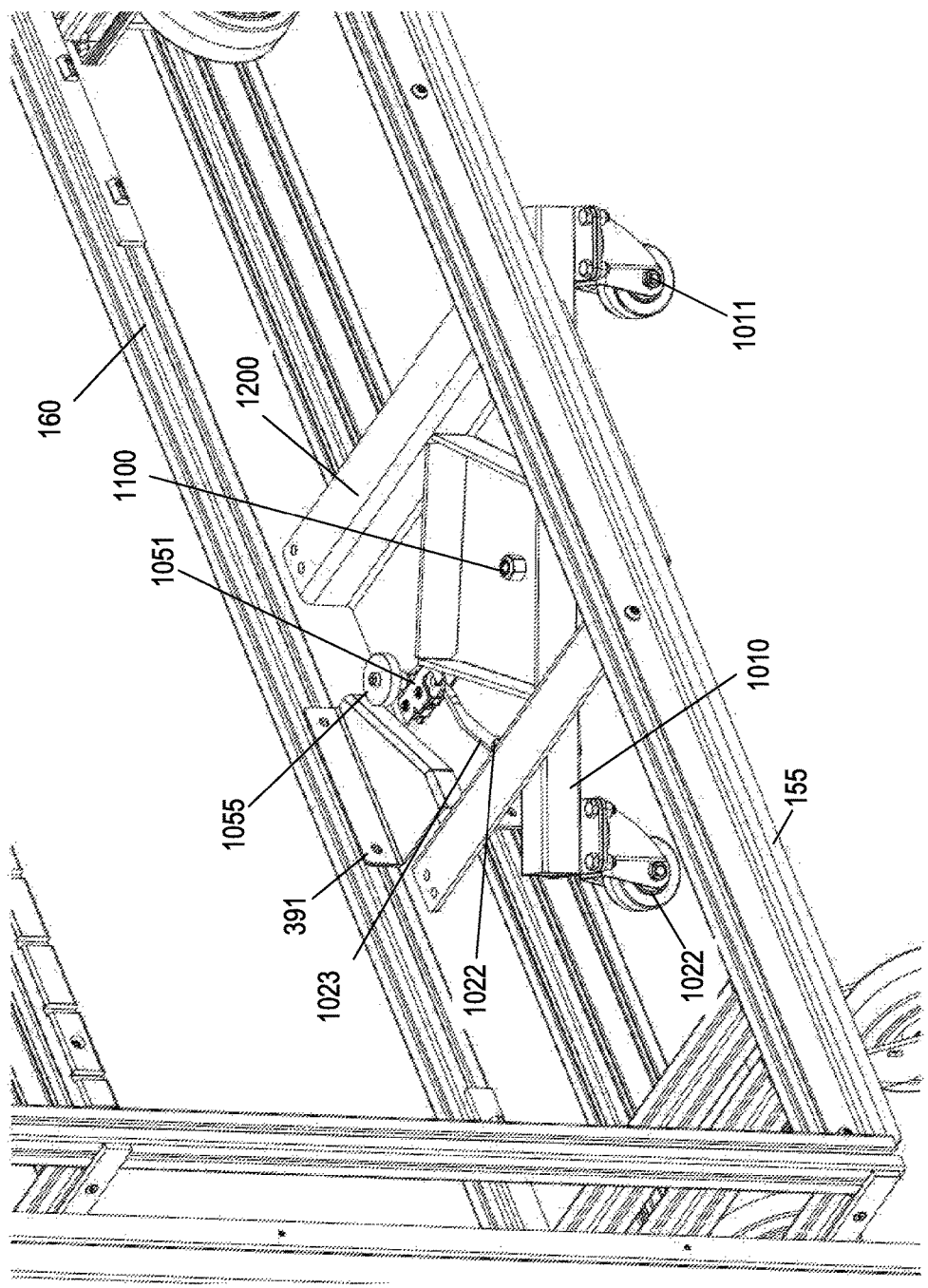

As shown in FIG. 20, upon the cart reaching the fully inserted position (as illustrated in FIG. 12), the release device 1055 remains in contact with the latch release member 391 and is proximate the rear of the housing 50. Moreover, as shown in FIG. 21, the rear portion of the outrigger member 1010 remains in contact with the pivot actuating member 392 when the cart 150 is in the fully inserted position within the housing 50. Indeed, as previously mentioned, the retractable support base 1000 may comprise a biasing system configured to bias the outrigger member 1010 toward the extended configuration, and accordingly when the cart 150 is fully inserted into the housing 50, the biasing system of the retractable support base 1000 may be configured to bias the outrigger member 1010 such that the rear portion of the outrigger member 1010 remains in contact with the pivot actuating member 392 while the outrigger member is in the retracted configuration. Moreover, when the cart 150 is removed from the housing 50, the biasing system causes the outrigger member 1010 to rotate toward the extended configuration until the rear portion of the outrigger member 1010 is no longer in contact with the pivot actuating member 392, and the support pin 1022 engages the latch mechanism 1050.

As shown in FIG. 22, which is a side sectional view of a cart 150 inserted into a housing 50, in the retracted configuration, the outrigger member 1010 is positioned at least substantially within the perimeter of the cart 150 as defined by the cart frame 160 and wheels 74-77, such that the outrigger member 1010 and outrigger wheels 1011, 1021 do not interfere with the functionality of various portions of the dispenser (e.g., security bar 430, item access mechanism 440, and/or the like).

Method of Providing Access to an Item Stored in a Cart

As previously described in reference to FIGS. 3-5, the illustrated dispenser 7 is configured for selectively providing access to a portion of the interior of the dispenser corresponding to a subset of the receptacles formed within the cart 150. The illustrated control system 70 is configured to receive a user input (e.g., via the user interface 72), and determine one or more appropriate receptacles containing one or more items for the user to receive.

Prior to receiving a user input, the item access mechanism 440 may be positioned in a ready position, wherein the item access mechanism 440 is proximate the second side of the access opening 110d (as shown in FIG. 3). The item access mechanism 440 may be secured in the ready position, such that an unauthorized user is prevented from repositioning the item access mechanism 440 without first providing a user input to the control system 70. However, in certain embodiments, the item access mechanism 440 may be freely repositioned laterally relative to the access opening 110 prior to use.

Referring again to FIG. 3, a user provides an input to the control system 70, such by providing input via the keypad, via a card swipe reader, and/or the like. In response, the control system 70 determines whether the user input is indicative of an authorized user, and if not, the control system 70 provides feedback indicating that the provided user input is incorrect.

Upon a determination that the user input is indicative of an authorized user, the control system 70 determines one or more receptacles of the cart for which to provide access. The control system 70 may have data stored therein indicative of various features of the items stored in each of the plurality of receptacles. Upon a user obtaining access to a particular receptacle, the control system 70 may be updated to reflect that the receptacle is thereafter empty, until the receptacle is reloaded. For example, a cart 150 may comprise clean scrubs to be worn by hospital personnel, and an upper portion of the cart 150 may comprise shirts and the bottom portion of the cart 150 may comprise pants. Upon receipt of user input indicative of an authorized user, the control system 70 may determine a single receptacle from the upper portion of the cart 150 containing an appropriately sized shirt for the user, and may determine a single receptacle from the lower portion of the cart 150 containing appropriately sized pants for the user. The user may thereafter be granted access to the receptacle containing the appropriately sized shirt and the receptacle containing the appropriately sized pants.

After determining one or more appropriate receptacles based at least in part on the provided user input, the control system 70 causes a position indicator light 309 to illuminate and thereby instruct to the user to move the item access mechanism 440 to the corresponding lateral position. As previously noted, upon the item access mechanism 440 reaching the indicated lateral position, the item access mechanism 440 may be locked into place (e.g., by a corresponding engagement mechanism) such that the item access mechanism 440 cannot be repositioned during use.

Additionally, after determining one or more appropriate receptacles for the user, the access panels corresponding to the upper access door 443a and the lower access door 443b move such that the aperture is aligned vertically with the row corresponding with the identified receptacle. Thus, prior to granting the user access to the interior of the dispenser 7, the aperture corresponding to the upper access door 443a is aligned with the identified receptacle, and the aperture corresponding to the lower access door 443b is aligned with the identified receptacle.

After the apertures are aligned with the one or more identified receptacles, the upper access door 443a and/or lower access door 443b are unlocked such that the user is granted access to the identified receptacles. As previously described, the various features of the dispenser 7, cart 150, and item access mechanism 440 substantially impede the user from accessing adjacent receptacles. For example, the user is prevented from pulling the item access mechanism 440 away from the cart 150 so as to obtain easier access to adjacent receptacles by the engagement between the lower guide member 446 of the item access mechanism 440 and the security bar 430, and the engagement between the guide 444 and the guide rail 155.

After the user retrieves the items from the one or more receptacles, the upper and lower access doors 443a, 443b are closed and locked, and item access mechanism 440 is unlocked such that it can slide laterally relative to the access opening 110. In various embodiments, the control system 70 may provide the user with instructions to return the item access mechanism to the ready position. However, in various embodiments the item access mechanism 440 is returned to the ready position automatically.

CONCLUSION

A dispenser 7 having a removable cart 150 with a plurality of receptacles therein allows the dispenser 7 to be restocked with items in a significantly reduced amount of time compared to other dispensers. Whereas other dispensers having a plurality of receptacles disposed within the dispenser must be restocked at a dispenser installation location by placing items in each of the receptacles individually, a dispenser 7 having a removable cart 150 may be restocked by simply removing an empty cart 150 from the dispenser 7 and replacing it with a filled cart 150 that may be restocked away from the installation location.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A cart for storing one or more items, the cart comprising:
    a cart body for storing one or more items, wherein the cart body defines a perimeter of the cart;
    a plurality of drive wheels secured relative to the cart body; and
    a retractable support base secured relative to the cart body, wherein the retractable support base comprises:
        a base frame secured relative to the cart body; and
        an outrigger member having a first distal end and a second distal end, wherein the outrigger member is pivotably secured relative to the base frame; and
    wherein the retractable support base is adjustable between:
        an extended configuration in which the first distal end and the second distal end of the outrigger member each extend beyond the perimeter of the cart; and
        a retracted configuration in which the first distal end and the second distal end of the outrigger member are each positioned within the perimeter of the cart.

2. The cart of claim 1, wherein the retractable support base is biased to the extended configuration.

3. The cart of claim 1, wherein the retractable support base further comprises a latch mechanism configured to lock the retractable support base in the extended configuration.

4. The cart of claim 3, wherein the latch mechanism comprises a release device, and wherein the release device is configured to unlock the retractable support base from the extended configuration upon application of a force to the release device.

5. The cart of claim 4, wherein the release device is positioned between the base frame and the cart body.

6. The cart of claim 1, wherein the outrigger member is configured to rotate about a vertical axis of rotation between the extended configuration and the retracted configuration, wherein the vertical axis of rotation is positioned between the first distal end and the second distal end.

7. The cart of claim 6, wherein the outrigger member rotates between 50 and 55 degrees between the extended configuration and the retracted configuration.

8. The cart of claim 1, wherein the first distal end of the outrigger member and the second distal end of the outrigger member is offset relative to the axis of rotation.

9. The cart of claim 1, wherein the perimeter of the cart has a rectangular cross-section, having a long dimension and a narrow dimension perpendicular to the long dimension, and wherein the retractable support base is configured such that the distal ends of the outrigger member extend beyond the perimeter of the cart in a direction parallel to the narrow dimension while in the extended configuration.

10. The cart of claim 9, wherein the first distal end extends beyond a front side of the cart and the second distal end extends beyond a rear side of the cart while in the extended configuration.

11. The cart of claim 10, wherein the first distal end extends beyond the front side of the cart by a first distance and the second distal end extends beyond the rear side of the cart by a second distance while in the extended configuration, and wherein the first distance is greater than the second distance.

12. The cart of claim 1, wherein the retractable support base further comprises:
   a first support wheel secured to the outrigger member at the first distal end; and
   a second support wheel secured to the outrigger member at the second distal end.

13. The cart of claim 12, wherein each of the first support wheel and the second support wheel are pivotably secured to the outrigger member.

14. The cart of claim 12, wherein each of the first support wheel and the second support wheel are spaced a distance away from a support surface while the drive wheels are supported by the support surface.

15. The cart of claim 1, wherein the cart body defines a plurality of receptacles each configured for storing an item therein and wherein an interior portion of each of the plurality of receptacles is accessible from a front side of the cart body.

* * * * *